(12) United States Patent
Li et al.

(10) Patent No.: US 9,354,362 B2
(45) Date of Patent: May 31, 2016

(54) OPTICAL DEVICES BASED ON DIFFRACTION GRATINGS

(75) Inventors: Jingjing Li, Palo Alto, CA (US); David A. Fattal, Mountain View, CA (US); Raymond G. Beausoleil, Redmond, WA (US); Marco Fiorentino, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 293 days.

(21) Appl. No.: 13/384,725

(22) PCT Filed: Sep. 23, 2009

(86) PCT No.: PCT/US2009/058006
§ 371 (c)(1),
(2), (4) Date: Jan. 18, 2012

(87) PCT Pub. No.: WO2011/037563
PCT Pub. Date: Mar. 31, 2011

(65) Prior Publication Data
US 2012/0194911 A1   Aug. 2, 2012

(51) Int. Cl.
*G02B 5/18* (2006.01)
*G02B 27/44* (2006.01)

(52) U.S. Cl.
CPC .................................. *G02B 5/1809* (2013.01)

(58) Field of Classification Search
CPC .......... G02B 5/08; G02B 5/18; G02B 5/1861;
G02B 5/1809; G02B 5/1814; G02B 19/0042;
G02B 1/105; G02B 27/0927; G02B 5/0808;
G02B 1/04; G02B 1/10; G02B 27/4205;
G02B 5/0816; G02B 5/1866; G02B 19/0019;
G02B 5/09; G02B 7/182

USPC ......... 359/558, 566, 569, 572, 575, 576, 838,
359/839, 840, 850, 871, 883, 484.03,
359/484.04

See application file for complete search history.

(56) References Cited

U.S. PATENT DOCUMENTS

| 5,140,149 A | 8/1992 | Sakata et al. |
| 5,726,805 A * | 3/1998 | Kaushik ..................... G01J 3/02 359/489.19 |

(Continued)

FOREIGN PATENT DOCUMENTS

| CN | 2571034 | 9/2003 |
| CN | 1507684 A | 6/2004 |

(Continued)

OTHER PUBLICATIONS

Berseth, Vertical cavity surface emitting lasers incorporating structured mirrors patterned by electron-beam lithography, Sep. 10, 1999, J Vac. Sci Technol B 17(6), pp. 3222-3225.*

(Continued)

*Primary Examiner* — James Greece
*Assistant Examiner* — Sharrief Broome
(74) *Attorney, Agent, or Firm* — Olympic Patent Works, PLLC

(57) ABSTRACT

Embodiments of the present invention relate to planar optical devices composed of one or more sub-wavelength diffraction grating layers. In one embodiment, an optical device includes a first substantially planar reflective structure (104,1904), a second substantially planar reflective structure (106,1906), and a substantially planar sub-wavelength grating layer (102, 1902) disposed between the first reflective structure and the second reflective structure. The grating layer is configured with lines (208-211,214-217) having line widths, line thicknesses, and line period spacing selected to control phase changes in different portions of a beam of light transmitted through the optical device.

18 Claims, 21 Drawing Sheets

(56) References Cited

U.S. PATENT DOCUMENTS

| | | | |
|---|---|---|---|
| 5,742,433 | A | 4/1998 | Shiono et al. |
| 6,195,381 | B1 | 2/2001 | Botez et al. |
| 6,417,968 | B1 | 7/2002 | Staub et al. |
| 6,590,267 | B1 | 7/2003 | Goodwin-Johansson et al. |
| 6,683,898 | B2 | 1/2004 | Ostergaard et al. |
| 6,697,405 | B2 | 2/2004 | Kitatani et al. |
| 6,707,548 | B2 | 3/2004 | Kreimer et al. |
| 6,741,624 | B2 | 5/2004 | Mears et al. |
| 6,785,320 | B1 | 8/2004 | Amos et al. |
| 6,818,959 | B2 | 11/2004 | Montelius et al. |
| 6,894,836 | B2 | 5/2005 | Christenson |
| 6,914,231 | B1 | 7/2005 | Stone |
| 7,096,498 | B2 | 8/2006 | Judge |
| 7,106,920 | B2 | 9/2006 | Liu |
| 7,173,764 | B2 | 2/2007 | Carr et al. |
| 7,180,930 | B2 | 2/2007 | Takaki et al. |
| 7,221,691 | B2 | 5/2007 | Johnson et al. |
| 7,302,130 | B2 | 11/2007 | Stone |
| 7,304,781 | B2 | 12/2007 | Chang-Hasnain et al. |
| 7,386,205 | B2 | 6/2008 | Wang et al. |
| 7,535,944 | B1 | 5/2009 | Guilfoyle et al. |
| 7,680,371 | B2 | 3/2010 | Cheben et al. |
| 7,693,205 | B2 | 4/2010 | Uchida |
| 9,093,819 | B2 | 7/2015 | Fattal et al. |
| 2002/0073338 | A1 | 6/2002 | Burrows et al. |
| 2002/0080493 | A1 | 6/2002 | Tsai et al. |
| 2003/0048824 | A1 | 3/2003 | Shinagawa et al. |
| 2003/0206681 | A1 | 11/2003 | Polonskiy et al. |
| 2003/0235229 | A1 | 12/2003 | Deng et al. |
| 2003/0235370 | A1 | 12/2003 | Taillaert et al. |
| 2004/0140428 | A1* | 7/2004 | Ionescu .......... H01L 27/14669 250/338.1 |
| 2005/0013334 | A1 | 1/2005 | Watanabe et al. |
| 2006/0042483 | A1 | 3/2006 | Work et al. |
| 2006/0109540 | A1 | 5/2006 | Kueks et al. |
| 2006/0126183 | A1 | 6/2006 | Hasman |
| 2006/0187987 | A1* | 8/2006 | Nomoto et al. .......... 372/45.01 |
| 2006/0232776 | A1 | 10/2006 | Hairston et al. |
| 2006/0245464 | A1 | 11/2006 | Hori et al. |
| 2006/0262250 | A1 | 11/2006 | Hobbs |
| 2006/0273284 | A1* | 12/2006 | Hirose ................ G02B 3/14 252/299.61 |
| 2007/0115553 | A1* | 5/2007 | Chang-Hasnain ... G02B 5/0816 359/572 |
| 2007/0153860 | A1 | 7/2007 | Chang-Hasnain et al. |
| 2007/0165214 | A1 | 7/2007 | Wu et al. |
| 2007/0201527 | A1 | 8/2007 | Hori et al. |
| 2008/0267236 | A1 | 10/2008 | Sigalas et al. |
| 2008/0317406 | A1 | 12/2008 | Santori et al. |
| 2009/0051930 | A1* | 2/2009 | Moulin ............. G01B 11/2527 356/605 |
| 2009/0097122 | A1 | 4/2009 | Niv |
| 2009/0116790 | A1 | 5/2009 | Mossberg et al. |
| 2009/0196319 | A1 | 8/2009 | Hori et al. |
| 2009/0324248 | A1* | 12/2009 | Shiraki ............ H04B 10/116 398/172 |
| 2010/0128749 | A1 | 5/2010 | Amann et al. |
| 2010/0279446 | A1 | 11/2010 | Henrichs |
| 2010/0316083 | A1 | 12/2010 | Chang-Hasnain et al. |
| 2011/0188119 | A1 | 8/2011 | Mathai et al. |
| 2012/0027339 | A1 | 2/2012 | Mathai et al. |
| 2012/0105962 | A1 | 5/2012 | Fattal et al. |
| 2012/0194911 | A1 | 8/2012 | Li et al. |

FOREIGN PATENT DOCUMENTS

| | | |
|---|---|---|
| CN | 1595221 | 3/2005 |
| CN | 1916668 | 2/2007 |
| JP | 2001033612 A | 2/2001 |
| JP | 2009188153 A | 8/2009 |
| KR | 10-20080009280 | 1/2008 |
| KR | 20080009280 | 1/2008 |
| KR | 10-20080099172 | 11/2008 |
| KR | 20080099172 A | 11/2008 |
| WO | WO-2006125196 | 11/2006 |
| WO | WO-2011008216 | 1/2011 |
| WO | WO-2012105945 | 8/2012 |

OTHER PUBLICATIONS

Berseth, C.-A. et al. Vertical cavity surface emitting lasers incorporating structured mirrors patterned by electron-beam lithography, J. Vac. Sci. Technol. B, Nov. 1999, vol. 17, No. 6, pp. 3222-3225.

Chang-Hasnain, C. J. et al. Tunable VCSEL Using High Contrast Grating, OSA CLE02009 May 2009.

Christensen, et al., "Low-distortion hybrid optical shuffle concept", Optics Letters, Feb. 1, 1999, pp. 169-171, vol. 24, No. 3.

International Search Report, May 31, 2010, PCT Application No. PCT/US2009/058006, Filed Sep. 23, 2009.

European Search Report (Supplementary), Apr. 26, 2013, EP Application No. 09849901.5.

Fattal, David, et al., "Flat Dielectric Grating Reflectors with High Focusing Power", 8 pages, <http://arvix.org/PScache/arxiv/pdf/1001/1 001.3711v1.pdf>, Jan. 21, 2010.

International Search Report, Aug. 2, 2011. PCT Patent Application No. PCT/US2010/054740.

International Search Report, Sep. 27, 2010. PCT Patent Application No. PCT/US2010/022632.

International Search Report, Apr. 20, 2010, PCT Patent Application No. PCT/US2009/051026.

International Search Report, Sep. 28, 2011, PCT Application No. PCT/US2011/023219.

Marino, Francesco, et al., "Single Mode Operation and Transverse Mode Control in VCSELs Induced by Frequency Selective Feedback", 3 pages, Dept. de Fisica Interdisciplinar, Institute Mediteraneo de Estudios Avanzados (CSIC-UIB), C/Miquel Marques 21, E-07190 Esporles, Spain.

Srinivasan, Kartik, et al.. "Fabrication-tolerant high quality factor photonic crystal microcavities." arXiv preprint physics/0312060 (2003).

Zhou, Ye, et al., "Transverse Mode Control in High-Contrast Subwavelength Grating VCSEL", 2 pages, Department of Electrical Engineering and Computer Sciences, University of California, Berkeley, USA, May 6-11, 2007.

Chang-Hasnain. C.J. et al., "High-Contrast Grating VCSELs," Selected Topics in Quantum Electronics, IEEE Journal of 15.3, May/Jun. 2009, pp. 869-878.

Extended European Search Report received in EP Application No. 09847443.0, Nov. 27, 2015, 7 pages.

* cited by examiner

OPTICAL DEVICES BASED ON DIFFRACTION GRATINGS

TECHNICAL FIELD

Embodiments of the present invention relate to optical devices, and, in particular, to optical devices including one or more high contrast, sub-wavelength diffraction gratings configured to operate as optical elements.

BACKGROUND

Minimizing the beam width or "spot size" of a focused beam of light is important in a number of technology areas. For example, spot size is important for writing data to, and reading data from, an optical disk. The smaller the spot size, the higher the recording density of the optical disk.

In order to obtain a small spot size, a beam is typically passed through a convex lens with a high numerical aperture ("NA"). The NA of a convex lens can be increased by increasing the thickness of the lens in the direction of the optic axis and shortening the focal length. However, incorporating such lenses in optical-based devices may be cost prohibitive because of the difficulty in fabricating very small lenses with large curvatures and because of the precise polishing needed to make the lenses aberration free. In addition, conventional convex and concave lenses may not be compatible with planar integrated circuits.

Focusing grating couplers can also be used to produce a focused beam of light. With a focusing grating coupler, light propagating along an optical waveguide can be projected into free-space outside of the waveguide and focused. Although a focusing grating coupler can be used to couple light from a waveguide to free space, it cannot be configured and operated to couple light from free space to free space.

Although in recent years there have been a number of advances in sub-wavelength optical element design and fabrication, designers and manufacturers of optical elements continue to seek enhancements that broaden the possible range of optical element designs and applications.

BRIEF DESCRIPTION OF THE DRAWINGS

FIG. 17A shows a top plan view of a one-dimensional grating pattern of a sub-wavelength grating layer of an optical device configured to operate as a prism in accordance with embodiments of the present invention.

DETAILED DESCRIPTION

Embodiments of the present invention relate to planar optical devices composed of one or more sub-wavelength diffraction grating layers. The one or more grating layers can be configured with sub-wavelength grating patterns and inserted between reflective structures to produce optical devices that control the phase front of transmitted light. In particular, embodiments of the present invention include configuring the optical devices to operate as conventional optical elements, such as a convex lens, a concave lens, or a prism. Embodiments of the present invention also include methods and design rules for patterning the one or more grating layers to generate a particular phase change in light transmitted through the optical device using conventional lithography and etching techniques.

In the following description, the term "light" refers to electromagnetic radiation with wavelengths in the visible and non-visible portions of the electromagnetic spectrum, including infrared and ultra-violet portions of the electromagnetic spectrum.

I. Planar Optical Devices

Figure 1A:
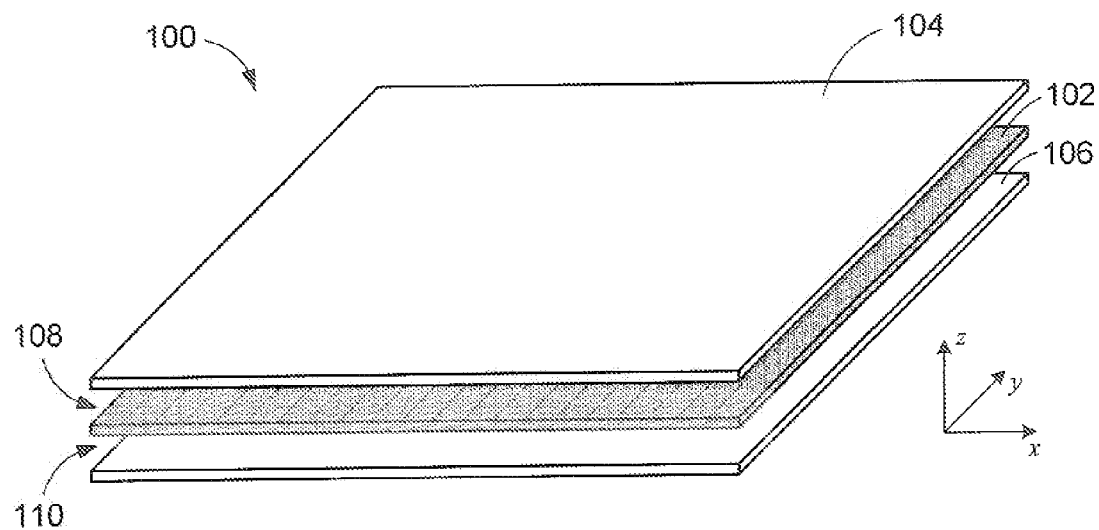
FIGS. 1A-1B show an isometric view, and an exploded isometric view, respectively, of an optical device configured in accordance with embodiments of the present invention.
Figure 1B:
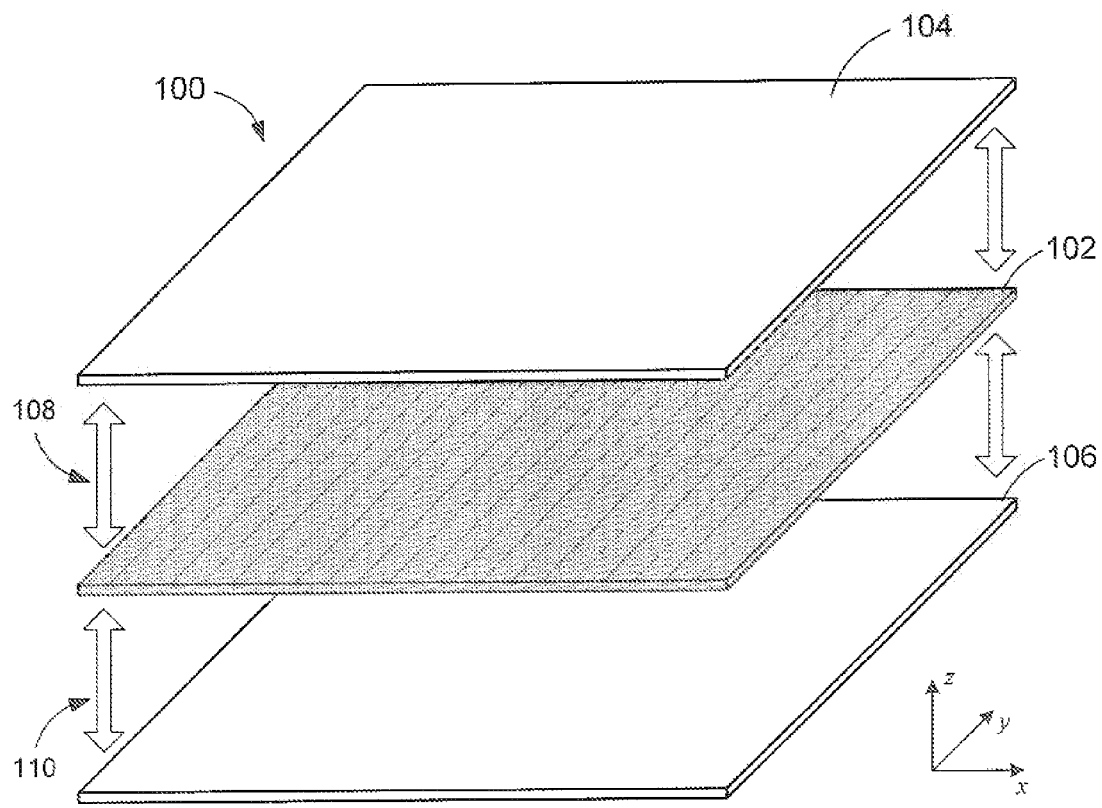

FIGS. 1A-1B show an isometric view, and an exploded isometric view, respectively, of an optical device 100 configured in accordance with embodiments of the present invention. The optical device 100 includes a substantially planar sub-wavelength grating ("SWG") layer 102 disposed between two approximately parallel, substantially planar, reflective structures 104 and 106. As shown in the example of FIG. 1, the substantially planar SWG layer 102 is positioned approximately parallel to the reflective structures 104 and 106 with spaces separating the SWG layer 102 from the reflective structures 104 and 106. The space between the SWG layer 102 and the reflective structure 104 forms a first resonant cavity 108, and the space between the SWG layer 102 and the reflective structure 106 forms a second resonant cavity 110, for appropriate wavelengths of electromagnetic radiation. The reflective structures 104 and 106 can be composed of a dielectric material; a semiconductor; a metal, such as gold or silver; or any other suitable material for forming resonant cavities 108 and 110. In certain embodiments, the cavities 108 and 110 can be filled with a material having a lower refractive index than the layers 102, 104, and 106, such as a suitable polymer material. In other embodiments, the cavities 108 and 110 can be air filled with the reflective structures 104 and 106 and the SGW layer 102 supported by at least one wall of a container (not shown).

Figure 2:
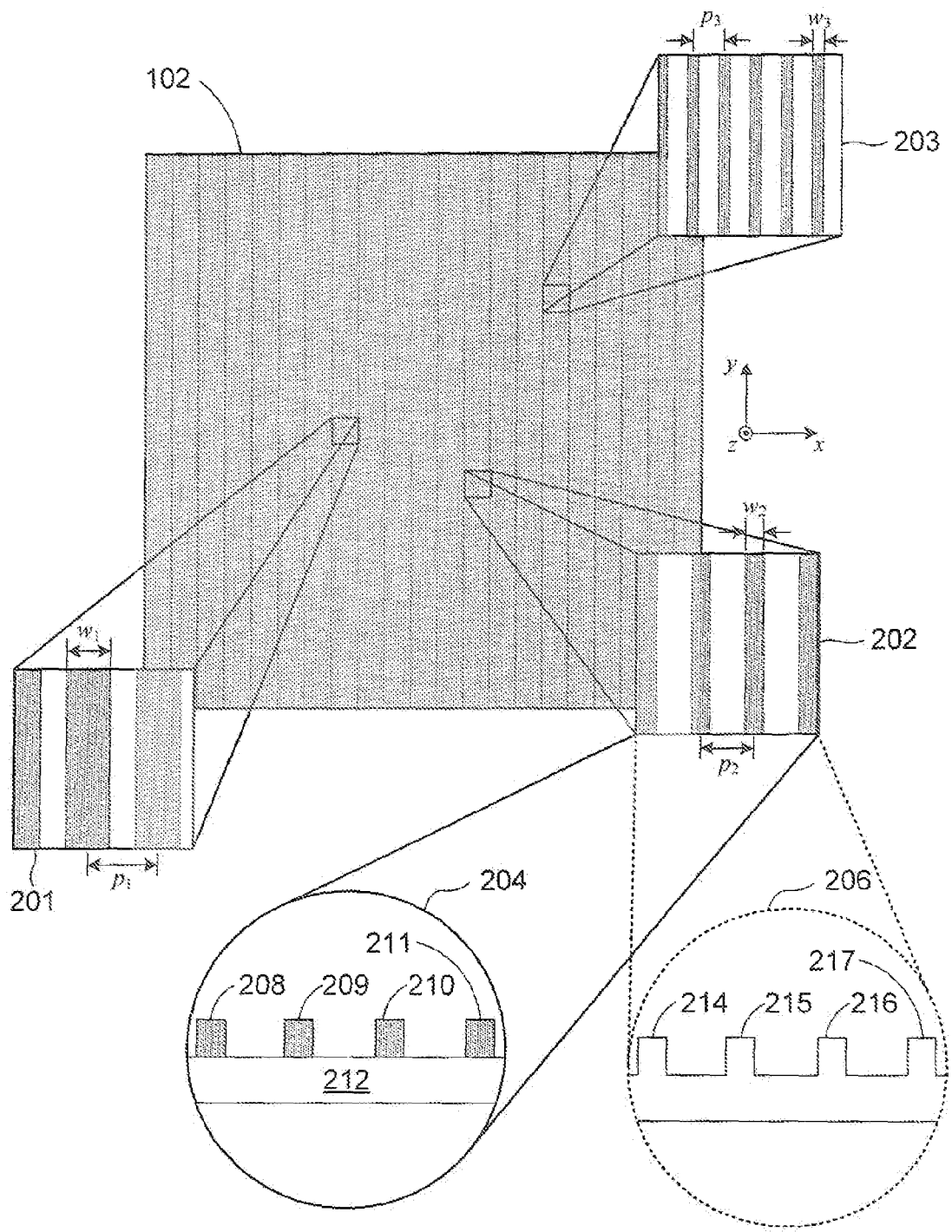
FIG. 2 shows a top plan view of a sub-wavelength grating layer of an optical device configured in accordance with embodiments of the present invention.

FIG. 2 shows a top plan view of the SWG layer 102 configured with a one-dimensional grating pattern in accordance with embodiments of the present invention. The one-dimensional grating pattern is composed of a number of one-dimensional grating sub-patterns. In the example of FIG. 2, three exemplary grating sub-patterns 201-203 are enlarged. Each grating sub-pattern comprises a number of regularly spaced wire-like portions of the SWG layer 102 material called "lines." The lines extend in the y-direction and are periodically spaced in the x-direction. FIG. 2 also includes two enlarged end-on views 204 and 206 of the grating sub-pattern 202. Each enlarged end-on view represents a different configuration embodiment for the SWG layer 102. In the embodiment represented in end-on view 204, the SWG layer 102 is composed of lines, such as lines 208-211, disposed on a surface of a substrate 212, where the lines are composed of a relatively higher refractive index material than the substrate 212. For example, the lines can be composed of silicon ("Si") and the substrate 212 can be composed of quartz or silicon dioxide ("$SiO_2$"), or the lines can be composed of gallium arsenide ("GaAs") and the substrate 212 can be composed of aluminum gallium arsenide ("AlGaAs") or aluminum oxide ("$Al_2O_3$"). In other embodiments represented in end-on view 206, the SWG layer 102 can be a single membrane with lines, such as lines 214-217, separated by grooves formed in the membrane. The single membrane can be composed of any suitable material, such as Si, GaAs, or indium phosphide ("InP").

As shown in the example of FIG. 2, each sub-pattern is characterized by a particular periodic spacing of the lines and by the line width in the x-direction. For example, the sub-pattern 201 comprises lines of width $w_1$ periodically spaced with a period $p_1$, the sub-pattern 202 comprises lines with width $w_2$ periodically spaced with a period $p_2$, and the sub-pattern 203 comprises lines with width $w_3$ periodically spaced with a period $p_3$. The grating sub-patterns 201-203 form sub-wavelength gratings that preferentially reflect incident light polarized in one direction, e.g. light polarized in the x direction, provided the periods $p_1$, $p_2$, and $p_3$ are smaller than the wavelength of the incident light. For example, the lines widths can range from approximately 10 nm to approximately 300 nm and the periods can range from approximately 20 nm to approximately 1 µm depending on the wavelength of the incident light. The light reflected from a region acquires a phase φ determined by the line thickness t, and the duty cycle η determined by:

$$\eta = \frac{w}{p}$$

where w is the line width and p is the period of the lines associated with the region.

Note the SWG layer 102 can be configured to reflect the x-polarized component or the y-polarized component of the incident light by adjusting the period, line width and line thickness of the lines. For example, a particular period, line width and line thickness may be suitable for reflecting the x-polarized component of light but may not be suitable for reflecting the y-polarized component; and a different period, line width and line thickness may be suitable for reflecting the y-polarized component but may not be suitable for reflecting the x-polarized component.

Each of the grating sub-patterns 201-203 also reflect incident light polarized in one direction, say the x-direction, differently due to the different duty cycles and periods associated with each of the sub-patterns.

Figure 3:
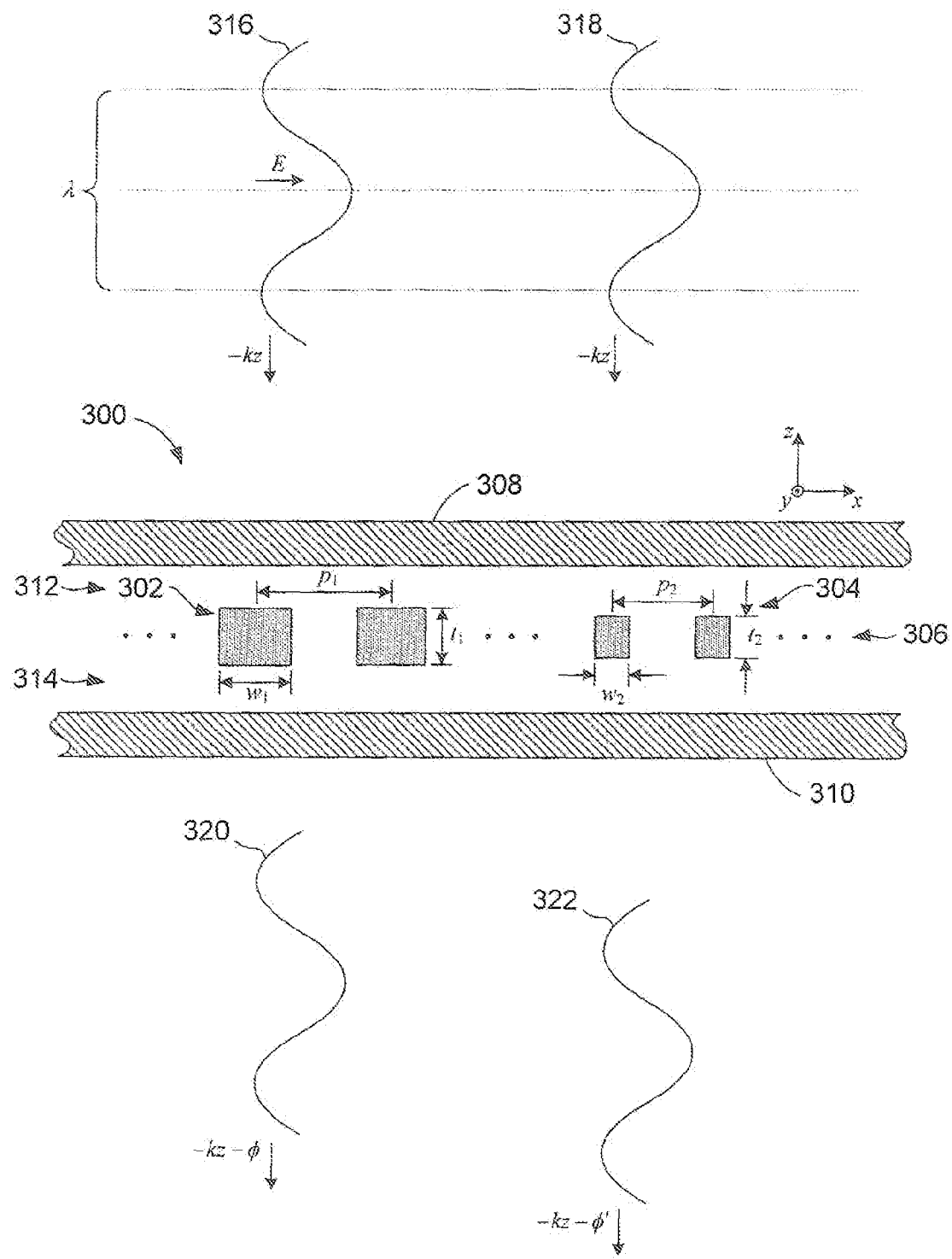
FIG. 3 shows a cross-sectional view of an optical device operated in accordance with embodiments of the present invention.

FIG. 3 shows a cross-sectional view of an optical device 300 revealing portions of two separate grating sub-patterns 302 and 304 of a SWG layer 306 disposed between a first reflective structure 308 and a second reflective structure 310 in accordance with embodiments of the present invention. For example, the sub-patterns 302 and 304 can be located in different regions of the SWG layer 306. The thickness $t_1$ of the lines of sub-pattern 302 are greater than the thickness $t_2$ of the lines of sub-pattern 304, and the duty cycle $\eta_1$ associated with the lines in sub-pattern 302 is greater than the duty cycle $\eta_2$ associated with the lines of sub-pattern 304. Light polarized in the x-direction and incident on the optical device 300 becomes trapped and oscillates for a period of time within the resonant cavities 312 and 314. The light is ultimately transmitted through the layers 306, 308, and 310, but with the portion of light transmitted through the sub-region 302 acquiring a larger phase shift than the portion of light transmitted through the sub-region 304. As shown in the example of FIG. 3, the incident waves 316 and 318 strike the optical device 300 with approximately the same phase, but the wave 320 transmitted through the sub-pattern 302 acquires a relatively larger phase shift φ than the phase shift φ' (i.e., φ>φ') acquired by the wave 322 transmitted through the sub-pattern 304.

Figure 4:
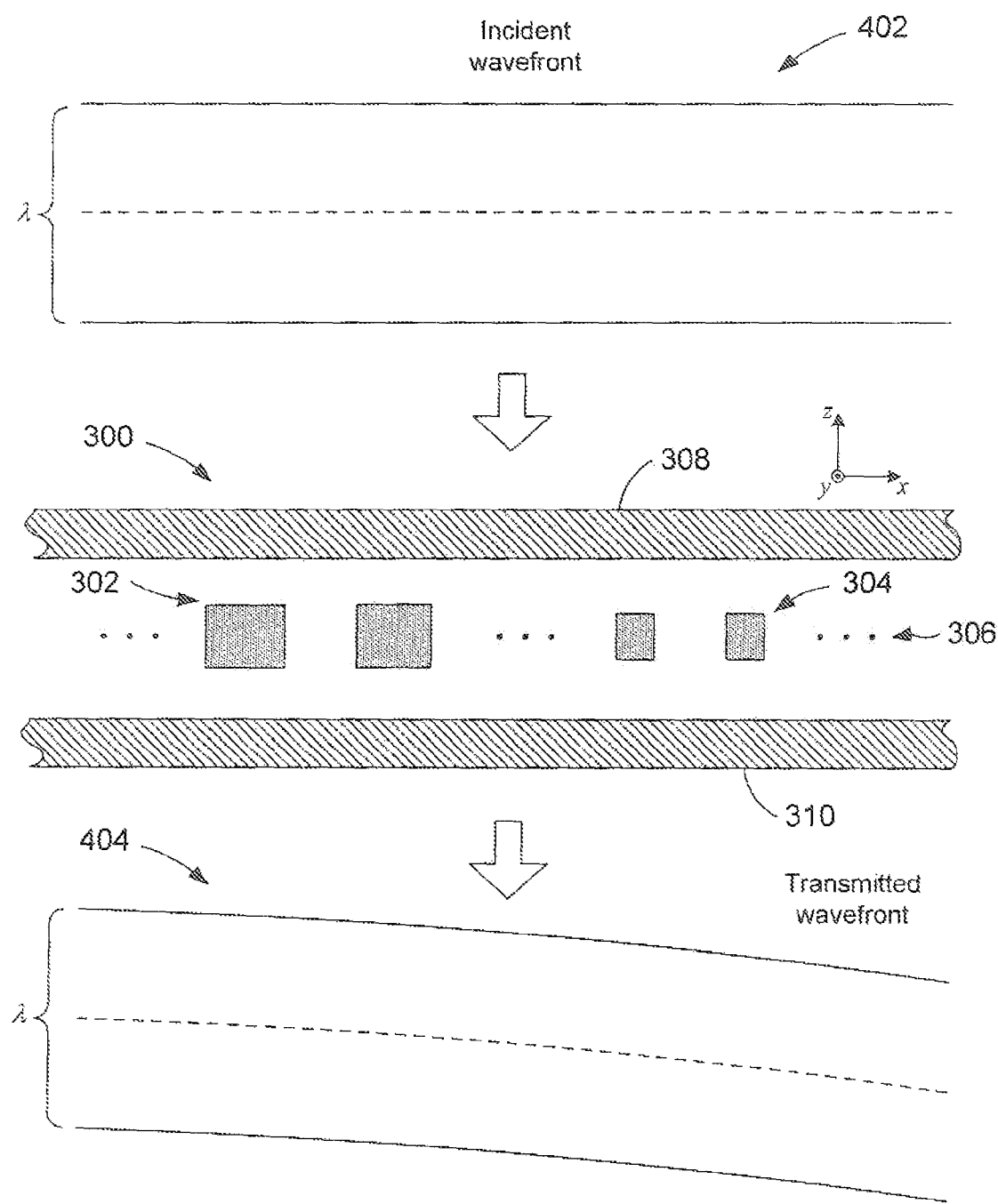
FIG. 4 shows a cross-sectional view of an optical device operated in accordance with embodiments of the present invention.

FIG. 4 shows a cross-sectional view of the optical device 300 revealing how a transmitted wavefront can be changed in accordance with embodiments of the present invention. As shown in the example of FIG. 4, incident light with a substantially uniform wavefront 402 strikes the optical device 300 producing transmitted light with a curved transmitted wavefront 404. The curved transmitted wavefront 404 results from portions of the incident wavefront 402 interacting with the sub-region 302 with a relatively larger duty cycle $\eta_1$ and thickness $t_1$ than portions of the same incident wavefront 402 interacting with the sub-region 304 with a relatively smaller duty cycle 72 and thickness $t_2$. The shape of the transmitted wavefront 404 is consistent with the larger phase acquired by light interacting with sub-region 302 relative to the smaller phase acquired by light interacting with the sub-region 304.

Optical devices of the present invention can be configured to apply a particular phase change to transmitted light. In particular, the SWG layer 102 can be configured with a one-dimensional grating pattern to apply a phase change to transmitted light polarized substantially perpendicular to the lines, as described above with reference to FIGS. 2-4.

Figure 5:
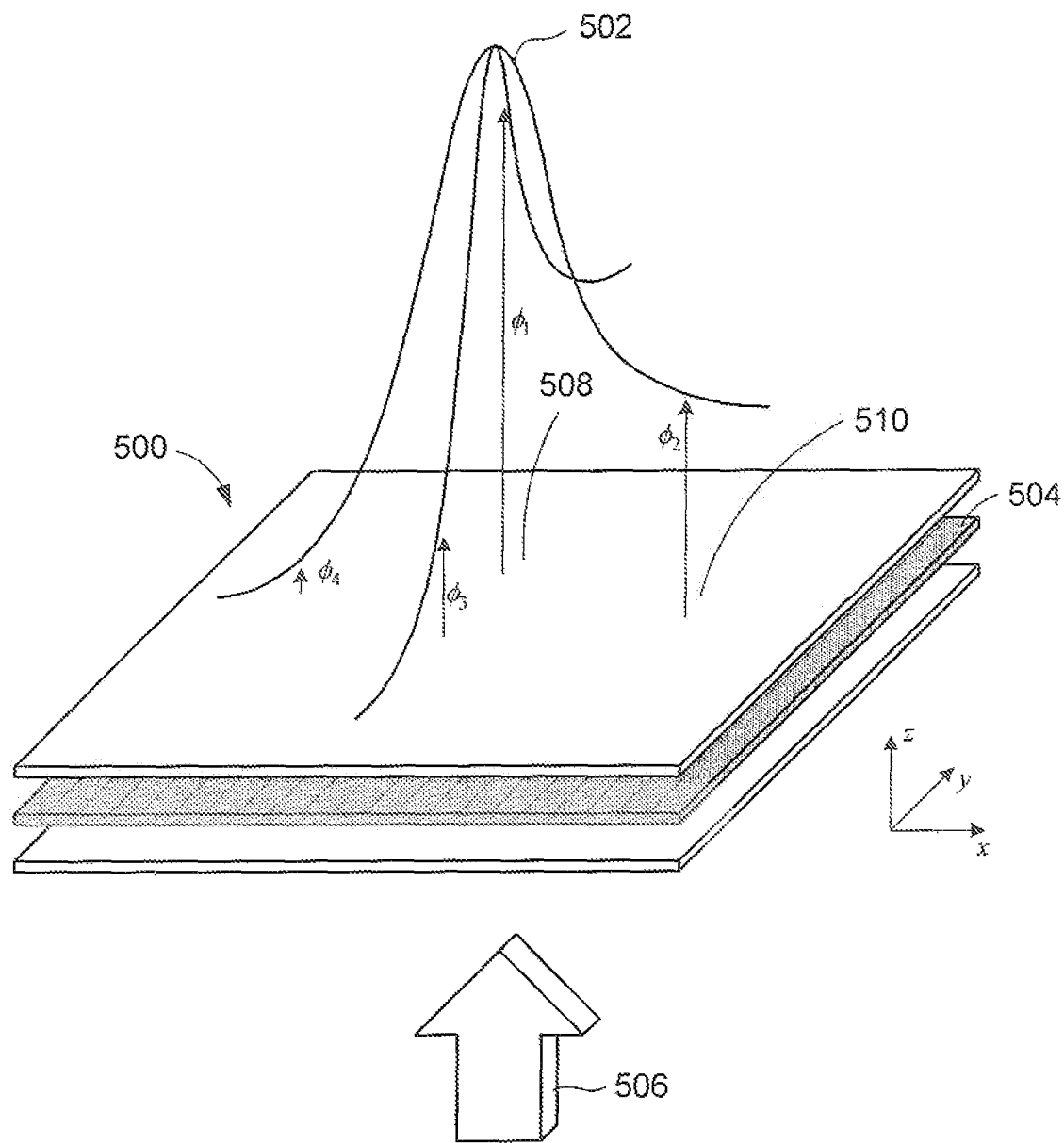
FIG. 5 shows an isometric view of an exemplary phase contour map produced in accordance with embodiments of the present invention.

FIG. 5 shows an isometric view of an exemplary phase change contour map 502 produced by a particular grating pattern of a SWG layer 504 of an optical device 500 configured and operated in accordance with embodiments of the present invention. The contour map 502 represents an example of the magnitude of the phase change acquired by light 506 transmitted through the optical device 500. In the example shown in FIG. 5, the grating pattern in the SWG layer 504 produces a tilted Gaussian-shaped phase contour map 502 with the largest magnitude in the phase acquired by transmitted light occurring near the center of the optical device 500. The magnitude of the phase acquired by transmitted light decreases away from the center of the optical device 500. For example, light transmitted near the center 508 of the optical device 500 acquires a phase of $\phi_1$ and light transmitted through the region 510 acquires a phase of $\phi_2$. Because $\phi_1$ is much larger than $\phi_2$, the light transmitted through the center 508 acquires a much larger phase than the light transmitted through the region 510.

The phase change in turn shapes the wavefront of light transmitted through the optical device. For example, as described above with reference to FIG. 3, lines having a relatively larger duty cycle produce a larger phase shift in transmitted light than lines having a relatively smaller duty cycle. As a result, a first portion of a wavefront transmitted a region of an optical device with sub-pattern lines having a first duty cycle lags behind a second portion of the same wavefront transmitted through a different portion of the optical device with sub-pattern lines having a second relatively smaller duty cycle. Embodiments of the present invention include patterning the SWG layer to control the phase change and ultimately the shape of the transmitted wavefront so that the optical device can be operated with particular optical properties, such as a focusing convex lens or a concave lens.

Figure 6B:
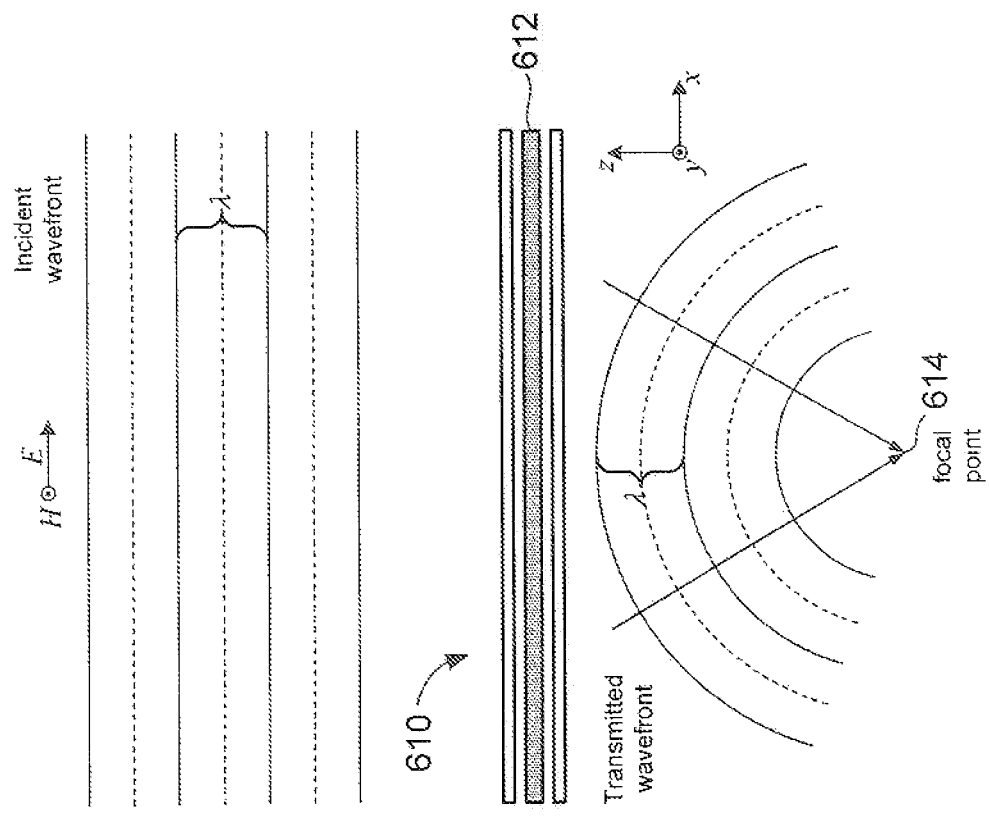
FIG. 6B shows a cross-sectional view of an optical device configured to focus light onto a focal point in accordance with embodiments of the present invention.
Figure 6A:
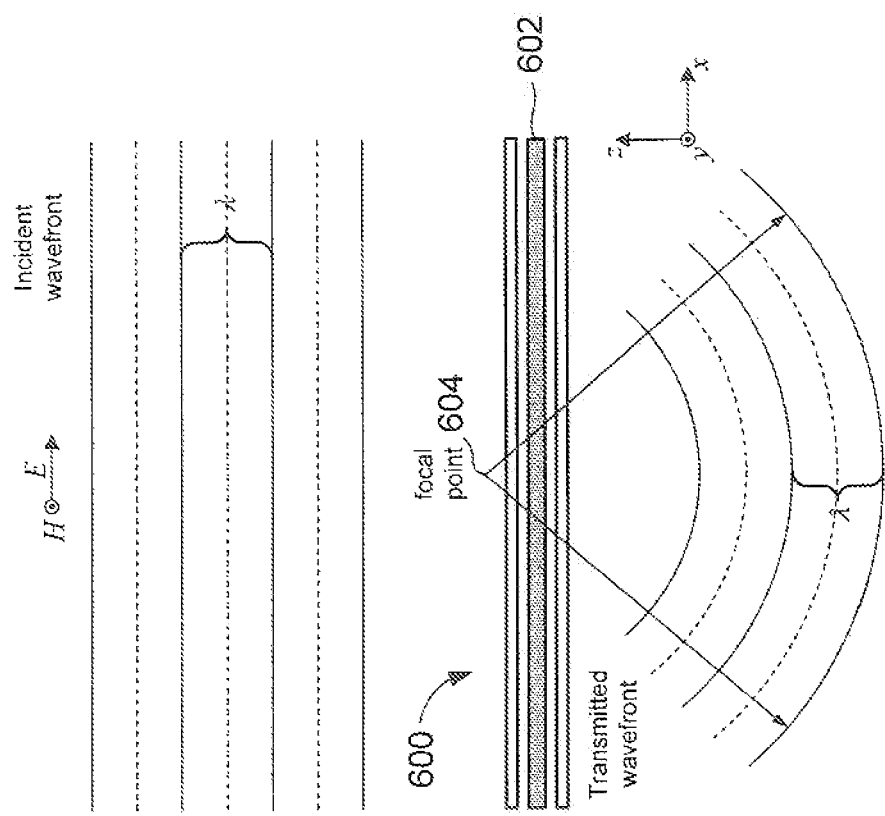
FIG. 6A shows a cross-sectional view of an optical device configured to produce divergent light in accordance with embodiments of the present invention.

FIG. 6A shows a cross-sectional view of an optical device 600 with a SWG layer 602 configured to diverge light as if the light emanated from a focal point 604 in accordance with embodiments of the present invention. In the example of FIG. 6A, the grating layer 602 is configured with a grating pattern so that incident light polarized in the x-direction is transmitted with a wavefront corresponding to diverging the transmitted light from the focal point 604. On the other hand, FIG. 6B shows a cross-sectional view of an optical device 610 with a SWG layer 612 configured to focus light onto a focal point 614 in accordance with embodiments of the present invention. In the example of FIG. 6B, the SWG layer 612 is configured with a grating pattern so that incident light polarized in the x-direction is transmitted with a wavefront corresponding to light directed to the focal point 614. SWG layer configurations for focusing and diverging light are described in greater detail below in a subsection titled Configuring Subwavelength Layers of Optical Devices.

II. Designing Optical Devices

Figure 7:
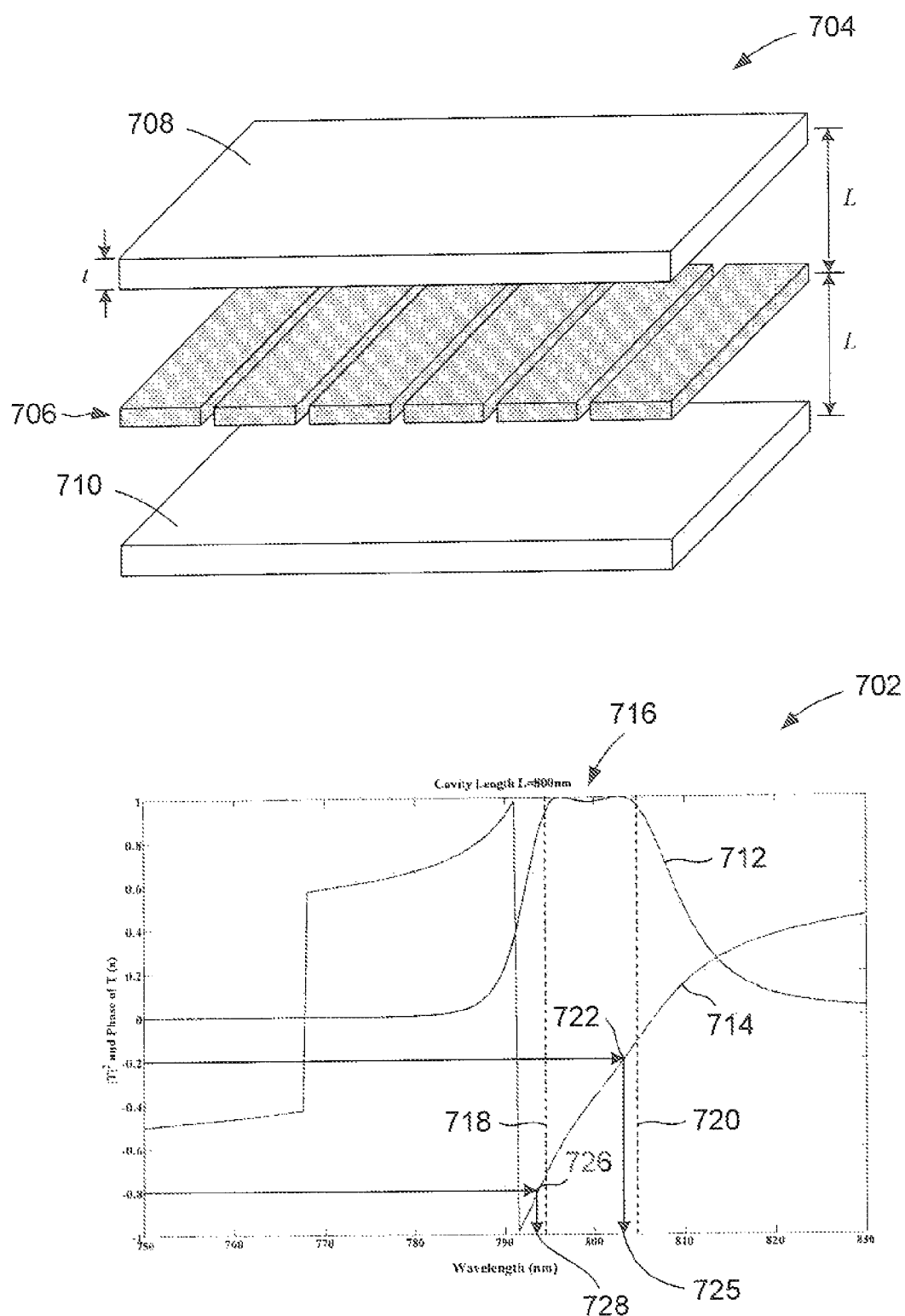
FIG. 7 shows a plot of transmittance and phase shift for an optical device over a range of wavelengths in accordance with embodiments of the present invention.

Embodiments of the present invention include a number of ways in which an optical device can be designed to introduce a desired phase front for transmitted light. Two examples of optical devices designed to produce particular phase changes in transmitted light are described above in FIG. 5. A first method includes determining a transmission profile for an optical device with a SWG layer. The transmission coefficient is a complex valued function represented by:

$$T(\lambda) = \sqrt{T_P(\lambda)} e^{i\phi(\lambda)}$$

where $T_P(\lambda)$ is the power transmittance of the optical device, and $\phi(\lambda)$ is the phase shift or change produced by the optical device. FIG. 7 shows a plot 702 of transmittance and phase shift simulation results over a range of incident light wavelengths for an optical device 704 including a SWG layer 706 in accordance with embodiments of the present invention. For the optical device 704, the cavity length L is 800 nm and the thickness t of the reflective structures is 280 nm. The reflective structures 708 and 710 have a refractive index of 3.48, and the SWG layer 706 has a refractive index of 3.2 and a one-dimensional grating pattern with a duty cycle of 0.45. The optical device 704 is operated at normal incidence with the electric field polarized substantially perpendicular to the lines comprising the SWG layer 706. In plot 702, curve 712 corresponds to the transmittance $T(\lambda)$ and curve 714 corresponds to the phase shift $\phi(\lambda)$ produced by the optical device 704 for the incident light over the wavelength range of approximately 750 nm to approximately 830 mm. The transmittance and phase curves 712 and 714 represent expected operation of the device 704 and can be obtained using either the application "MIT Electromagnetic Equation Propagation" ("MEEP") simulation package to model electromagnetic systems (ab-initio.mit.edu/meep/meep-1.1.1.tar.gz), or COMSOL Multiphysics® which is a finite element analysis and solver software package that can be used to simulate various physics and engineering applications (www.comsol.com). Curve 712 reveals a broad spectral region of high transmittance 716. However, curve 714 reveals that the phase of the reflected light varies across the entire high-reflectivity spectral region between dashed-lines 718 and 720.

The plot 702 can be used to uniformly adjust geometric parameters of the entire optical device in order to produce a desired change in the transmitted wavefront. When the spatial dimensions of the entire optical device are changed uniformly by a factor $\alpha$ the transmission coefficient profile remains substantially unchanged, but with the wavelength axis scaled by the factor $\alpha$. In other words, when an optical device has been designed with a particular transmission coefficient $T_0$ at a free space wavelength $\lambda_0$, a new optical device with the same transmission coefficient at a different wavelength $\lambda$ can be designed by multiplying the optical device geometric parameters, such as the cavity length, line period spacing, line thickness, and line width, by the factor $\alpha = \lambda/\lambda_0$, giving $T(\lambda) = T_0(\lambda/\alpha) = T_0(\lambda_0)$.

In addition, an optical device can be designed so that the optical device has a $|T(\lambda)| \to 1$, but with a spatially varying phase and for a fixed resonator length, by scaling the parameters of the optical device within the high-transmission spectral window 716. Suppose that introducing a phase $\phi(x,y)$ to light transmitted through a point of an optical device with transverse coordinates (x,y) is desired. Near the point (x,y), a nonuniform grating with a slowly varying scale factor $\alpha(x,y)$ behaves locally as though the optical device was configured with a periodic grating with a transmission coefficient $T_0(\lambda/\alpha)$. Thus, for an optical device with a certain resonator cavity length and periodic grating design with a phase $\phi_0$ at some wavelength $\lambda_0$, choosing a local scale factor $\alpha(x,y)=\lambda/\lambda_0$ gives $\phi(x,y)=\phi_0$ at the operating wavelength $\lambda$. For example, suppose that introducing a phase of approximately $-0.2\pi$ on a portion of the light transmitted through a point (x,y) on an optical device is desired, but current design of the optical device introduces a phase of approximately $-0.8\pi$. Referring to the plot 702, the desired phase $\phi_0=-0.2\pi$ corresponds to the point 722 on the curve 714 and the wavelength $\lambda_0=803$ nm 725, and the phase $-0.8\pi$ associated with the point (x,y) corresponds to the point 726 on the curve 714 and the wavelength $\lambda\approx794$ nm. Thus the scale factor is $\alpha(x,y)=\lambda/\lambda_0=794/803=0.989$, and the geometric dimension of the optical device, such as the cavity length L, the thickness of the slabs 708 and 710 t, the thickness, line period spacing, and line width of the grating 706 at the point (x,y) can be adjusted by multiplying by each of these parameters by the factor $\alpha$ in order to obtain the desired transmission phase $\phi_0=-0.2\pi$ at the point (x,y) for the operating wavelength $\lambda\approx794$ nm.

Figure 8:
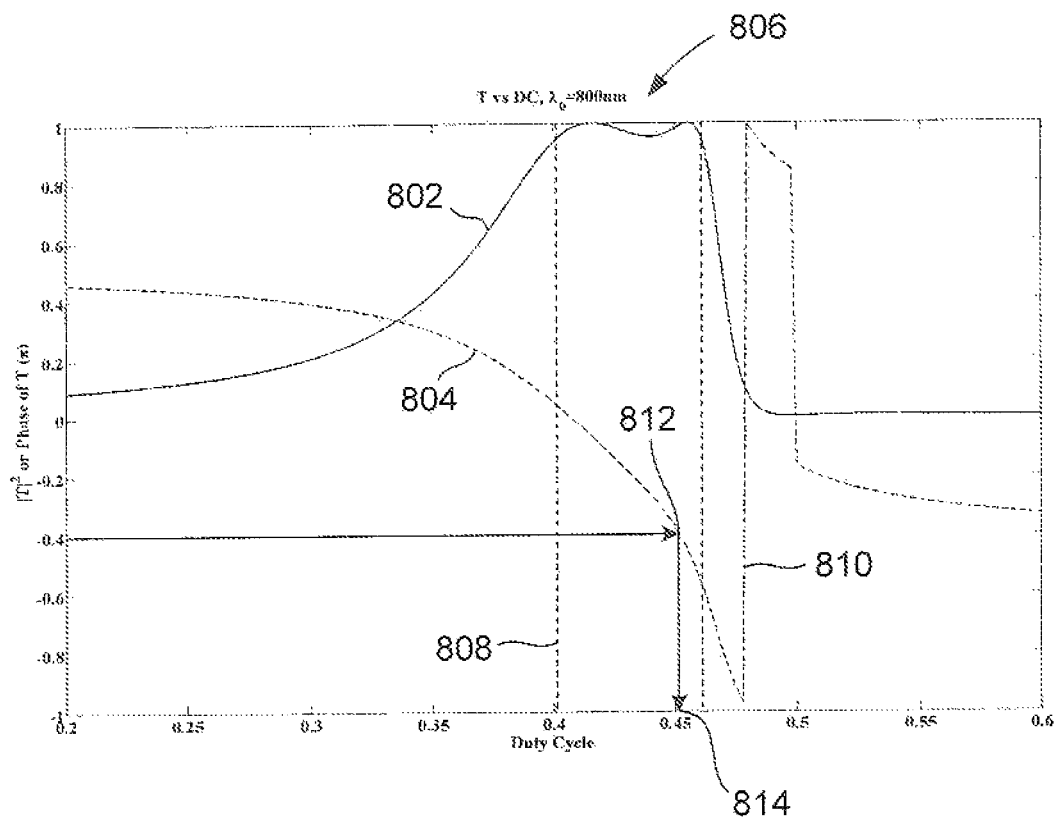
FIG. 8 shows a plot of transmittance and phase shift as a function of duty cycle for a sub-wavelength grating layer in accordance with embodiments of the present invention.

The plot of transmittance and phase shift versus a range of wavelengths shown in FIG. 7 represents one way in which parameters of an optical device can be selected in order to introduce a particular phase to light transmitted through a particular point of the optical device. In certain embodiments, producing a desired phase variation in transmitted light through an optical device can be accomplished by changing the duty cycle of the SWG layer without also adjusting the cavity length L and thickness t of the slabs. FIG. 8 shows a plot 702 of transmittance and phase shift as a function of the SWG layer duty cycle for light with a wavelength of approximately 800 nm. The optical device 704 is operated at normal incidence with the electric field polarized substantially perpendicular to the lines comprising the SWG layer 706. In FIG. 8, curve 802 corresponds to the transmittance $T(\lambda)$ and curve 804 corresponds to the phase shift $\phi(\lambda)$ produced by the optical device 704 for the incident light with the wavelength of approximately 800 nm over a range of duty cycles from approximately $0.2\pi$ to approximately $0.6\pi$. The transmittance and phase curves 802 and 804 can be determined using either MEEP or COMSOL Multiphysics®. Curve 802 reveals a broad spectral region of high transmittance 806. However, curve 804 reveals that the phase of the reflected light varies across the entire high transmittance region 806 between dashed-lines 808 and 810 as a function of the duty cycle of the SWG layer. Thus, an optical device can be operated to transmit light with the wavelength 800 nm, with a high transmittance 806, and with a desired phase shift by configuring a corresponding region of the SWG layer 706 with a duty cycle corresponding to the desired phase shift based on the curve 804. For example, suppose that it is desired to transmit light through a particular region of the optical device with a phase shift of $-0.4\pi$. A phase shift of $-0.4\pi$ corresponds to a point 812 on the curve 804 and to a duty cycle of 0.451 (814). Thus, in order to introduce the phase shift of $-0.4\pi$ to light transmitted through this region, the corresponding region of the SWG layer 706 alone can be configured with the duty cycle of 0.451 (814).

Figure 9:
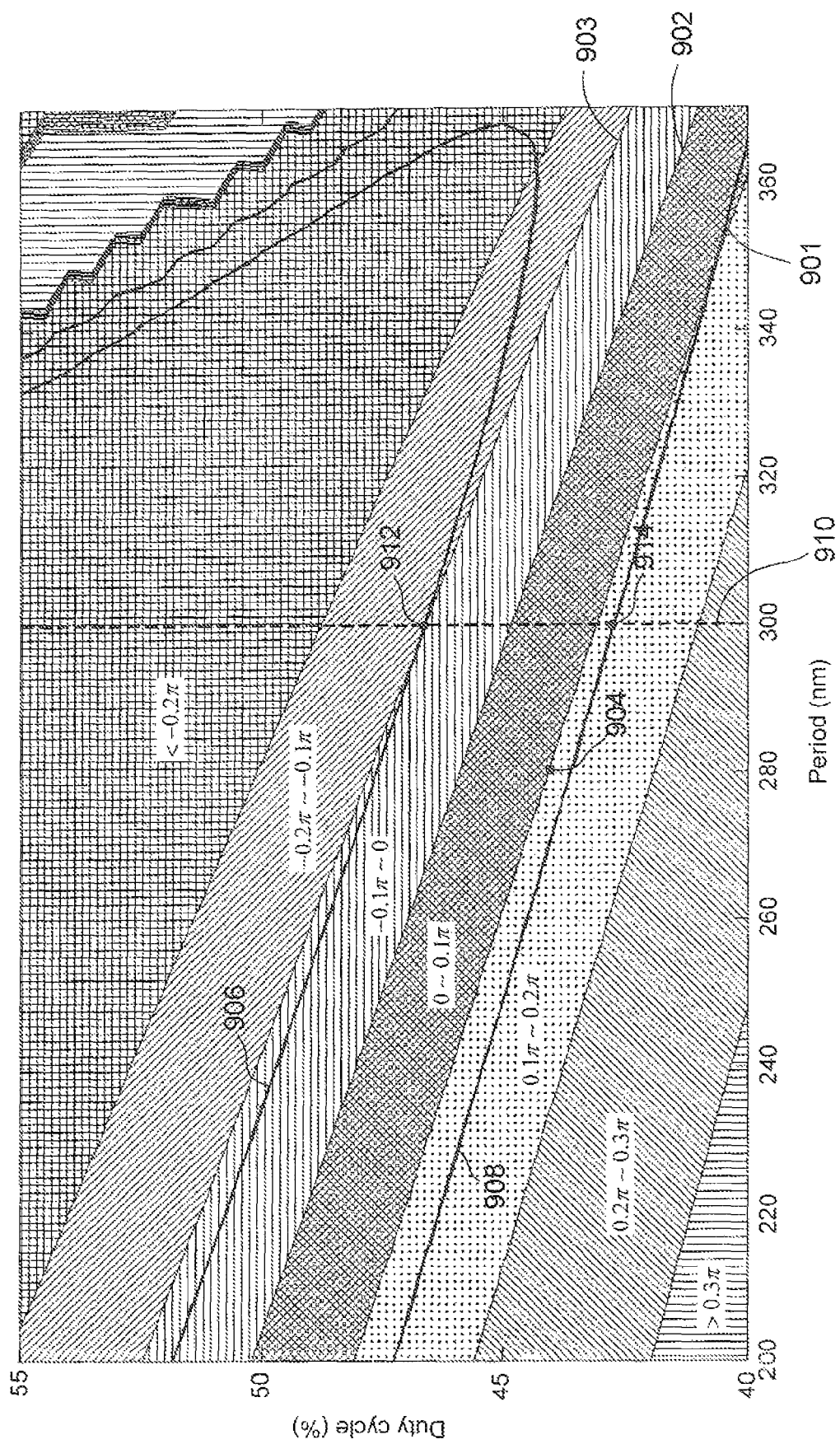
FIG. 9 shows a contour plot of phase shift variation as a function of period and duty cycle obtained in accordance with embodiments of the present invention.

In still other embodiments, variations in the phase of light transmitted through an optical device can be accomplished as a function of line period spacing and duty cycle of the SWG layer of the optical device without also adjusting the cavity length L and slab thickness t. FIG. 9 shows a contour plot of phase variation as a function of period and duty cycle obtained in accordance with embodiments of the present invention using either MEEP or COMSOL Multiphysics®. Contour lines, such as contour lines 901-903, each correspond to a particular phase acquired by light transmitted through an optical device with the SWG layer configured with a period and duty cycle lying anywhere along the contour. The phase contours are separated by $0.1\pi$ rad. For example, contour 901 corresponds to periods and duty cycles that apply a phase of $0.1\pi$ rad to transmitted light. Phases between $0.1\pi$ rad and 0.0 rad are applied to light transmitted through a region of an optical device where the SWG layer has periods and duty cycles that lie between contours 901 and 902. A point (p,η) 904 corresponds to a grating period of 280 nm and 44% duty cycle. A sub-region of the SWG layer with a period and duty cycle corresponding to the point 904 introduces the phase $\phi=0.1\pi$ rad to light transmitted through the sub-region of the optical device. FIG. 9 also includes two transmission contours 906 and 908 for 95% transmission overlain on the phase contour surface. Points (p,η,$\phi$) that lie anywhere between the contours 906 and 908 have a minimum transmission of 95%.

The points (p,η,$\phi$) represented by the phase contour plot can be used to select periods and duty cycles for a SWG layer of an optical device that can be operated as a particular type of lens with a minimum transmission, as described below in the next subsection. In other words, the data represented in the phase contour plot of FIG. 9 can be used to configure the grating sub-patterns of a SWG layer of an optical device so that the optical device can be operated like a convex lens, a concave lens, or a prism. In certain embodiments, the period or duty cycle can be fixed while the other parameter is varied to configure the SWG layer. In other embodiments, both the period and duty cycle can be varied to configure the SWG layer.

III. Configuring Sub-Wavelength Layers of Optical Devices

Figure 10:
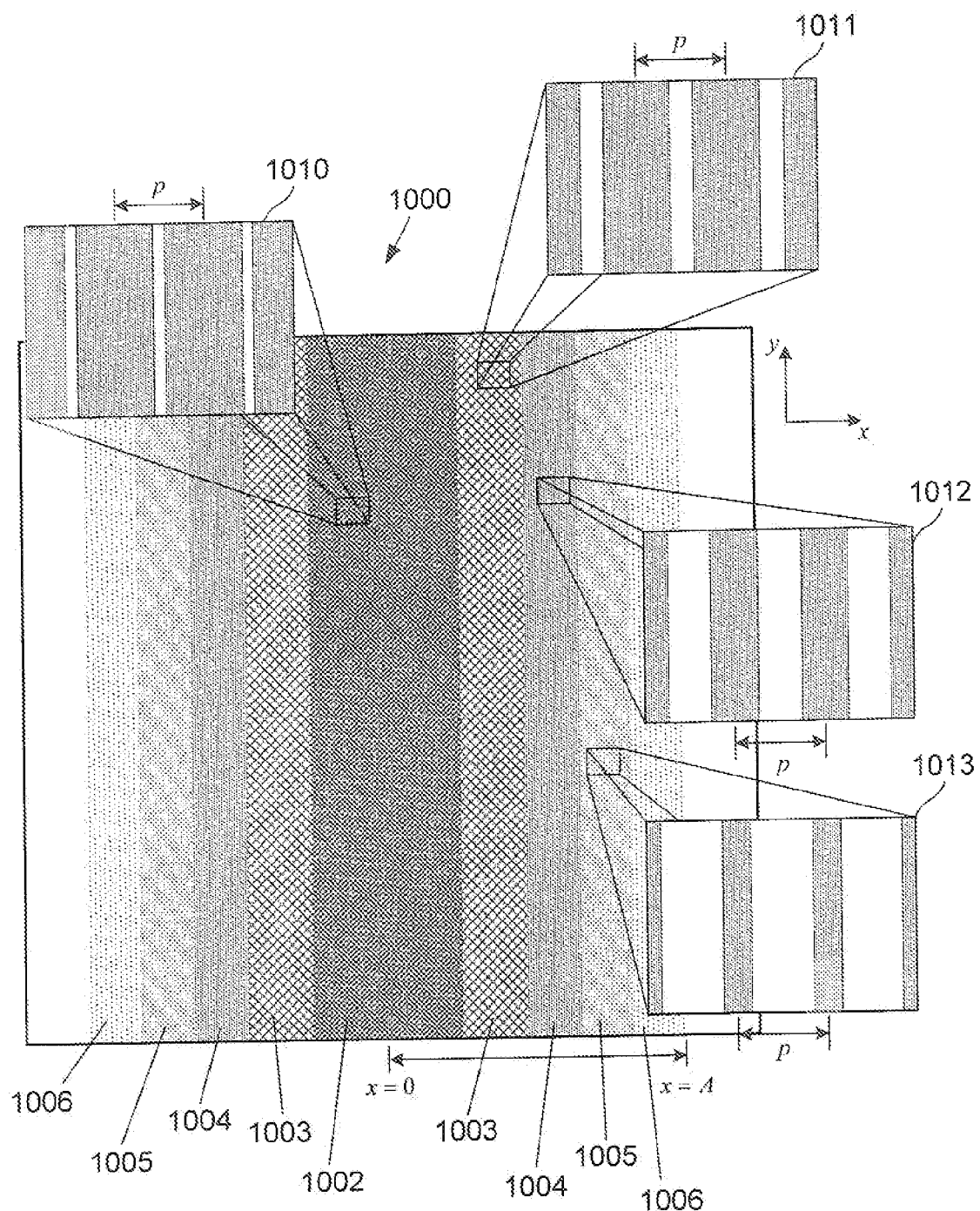
FIG. 10 shows a top plan-view of a sub-wavelength grating layer of an optical device configured to operate as a convex lens in accordance with embodiments of the present invention.

Embodiments of the present invention include methods for designing a grating pattern of a SWG layer of an optical device configured to operate as a lens that produces a desired continuous phase distribution in transmitted light. The desired continuous phase distribution can be used to determine the period and the duty cycle across the SWG layer based on the contour plot show in FIG. 9. For a first example, consider configuring a simple SWG layer of an optical device configured to operate as a convex lens for polarized light. In the following example, changes in the duty cycle are achieved by varying the line width of the SWG layer while holding the period constant throughout. FIG. 10 shows a top plan-view of a SWG layer 1000 with a one-dimensional grating of an optical device configured to operate as a convex lens for incident light polarized substantially parallel to the x-direction in accordance with embodiments of the present invention. The grating pattern of the SWG layer 1000 defines a lens aperture extending the length of the SWG 1000 in the y-direction and having a length 2A in the x-direction. Each shaded region represents a different grating sub-pattern of lines extending the y-directions, with darker shaded regions, such as region 1002, representing regions with a relatively larger duty cycle than lighter shaded regions, such as region 1006. FIG. 10 also includes enlargements 1010-1013 of sub-regions of the four regions 1002-1005 revealing that the lines run parallel in the y-direction and the line period spacing p is constant or fixed in the x-direction. Enlargements 1010-1013 also reveal that the line width w, in other words the duty cycle η, decreases away from the center. The SWG layer 1000 is configured so that light polarized in the x-direction and transmitted through an optical device is focused at a focal point, as described above with reference to FIG. 6A.

Prior to fabricating the SWG layer 1000 shown in FIG. 10, a minimum transmission, focal length f, aperture size 2A, and preferred period range $p_{min}$ and $p_{max}$ are determined. The minimum transmission, focal length f, and aperture size 2A are constraints that may be determined by the user, based on how the optical device incorporating the SWG layer 1000 is intended to be used. For example, a user may want to employ an optical device with a preferred focal length of 15 mm and with a minimum transmission of 85%. In addition, the aperture may be constrained to 10 mm.

Figure 11A:
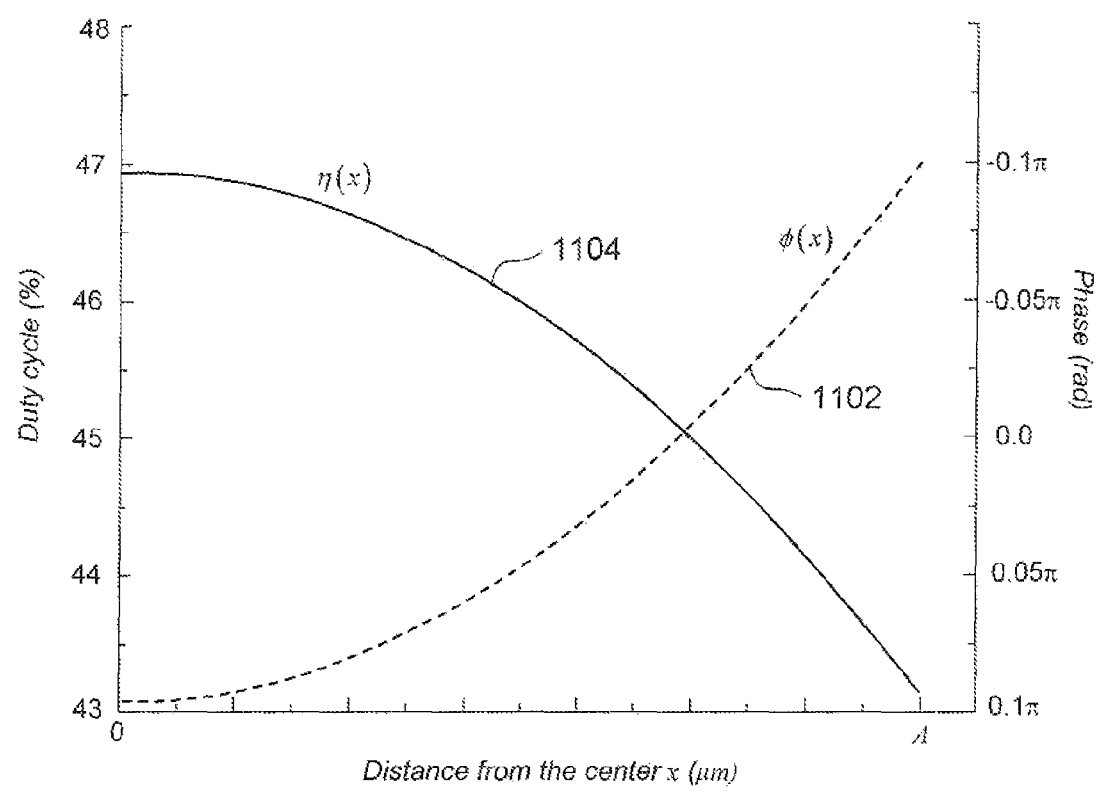
FIG. 11A shows an exemplary plot of a target phase of an optical device configured in accordance with embodiments of the present invention.

Once the parameters for the SWG layer have been determined, a desired or target phase change across the lens in the x-direction can be calculated. For example, for a convex lens, the target phase change across the SWG layer can be determined according to the expression:

$$\phi(x) = \phi_0 + \frac{2\pi}{\lambda R_M} x^2$$

where $\phi_0$ is the largest phase shift, $R_M$ is the spherical radius or curvature of the lens (i.e., $R_M$=2f), and x represents the distance from the center of the lens, as shown in FIG. 10, with the constraint 0≤x≤A. FIG. 11A shows an exemplary plot of the target phase $\phi(x)$ for the SWG layer of an optical device configured in accordance with embodiments of the present invention. In the example of FIG. 11A, curve 1102 corresponds to the target phase $\phi(x)$ over the distance from the center of the SWG layer 1000 at x=0 to the edge of the aperture x=A with $\phi_0$=0.1π. In other words, the target phase $\phi(x)$ 1102 represents a desired phase change acquired by light polarized in the x-direction and transmitted through an optical device. The desired phase change is produced by configuring the SWG layer with the appropriate duty cycle between x=0 and x=A.

The target phase change $\phi(x)$ shown in FIG. 11A and the phase contour information represented in FIG. 9 can be used in combination to determine an appropriate fixed period and duty cycles in the x-direction of the SWG mirror. For example, suppose the desired minimum transmission is 95%. For the fixed period SWG mirror 1000, the optimum period can be determined by matching points of the target phase $\phi(x)$ 1102, shown in FIG. 11A, with points of the phase contour surface of FIG. 9, with the constraints that the period lies between $p_{min}$ and $p_{max}$, and the points x=0 and x=A μm intersect the 95% transmission contours 906 and 908, respectively. This is equivalent to the conceptual operation of overlaying the phase $\phi(x)$ 1102 onto the contour surface of FIG. 9 with the target phase $\phi(x)$ 1102 directed perpendicular to the period axis, between $p_{min}$, and $p_{max}$, such that x=0 and x=A μm intersect the transmission contours 906 and 908, respectively, and the values of the target phase $\phi(x)$ 1102 substantially correspond to values of the phase contour surface. Referring now to the contour plot shown in FIG. 9, line 910 between the points 912 and 914 corresponds to the phase $\phi(x)$ 1102 substantially matching phase values of the phase contour surface. The point 912 on the 95% reflectivity contour 906 corresponds to the phase $\phi(A)$, and the point 914 on the 95% reflectivity contour 908 corresponds to the phase $\phi(0)$. The line 910 intersects the period axis at 300 nm, which corresponds to the optimum fixed period p for the lines of the SWG layer. The duty cycles associated with the regions of the SWG mirror 1000 along the x-direction can now be determined by reading the duty cycle values between the points 912 and 914.

Returning to FIG. 11A, the plot includes the duty cycle as a function of the x-coordinate, η(x), between x=0 and x=A in accordance with embodiments of the present invention. Curve 1104 represents the duty cycle η(x) determined by overlaying the target phase $\phi(x)$ 1102 on the phase contour surface, shown in FIG. 9, and reading off the corresponding duty cycle values from the duty cycle axis between the points 912 and 914 of FIG. 9. The duty cycle η(x) 1102 can be used to determine the duty cycle for points along the x-direction of the SWG mirror. The duty cycle and associated x-coordinate values can be stored in a look-up table and used to generate the SWG layer grating pattern.

Figure 11B:
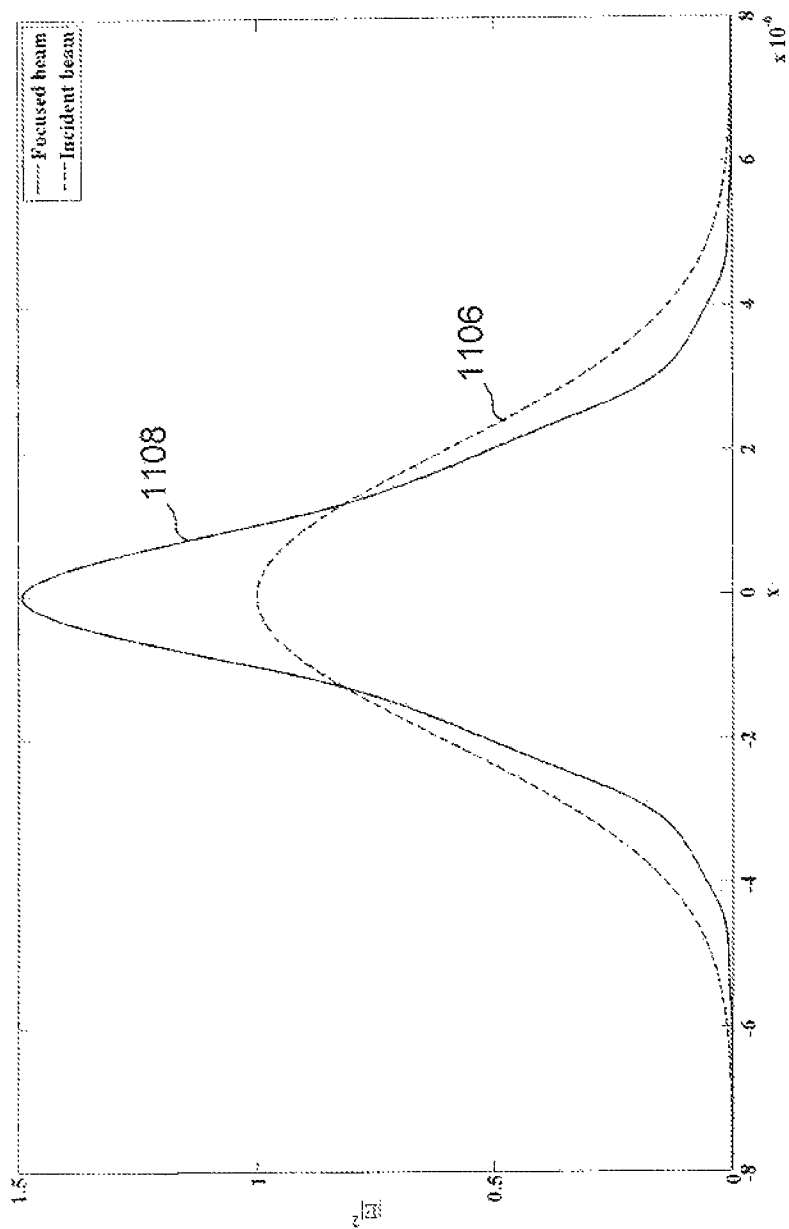
FIG. 11B shows Gaussian-shaped beam profiles for an incident beam and a transmitted focused beam obtained by simulating the operation of an optical device configured in accordance with embodiments of the present invention.

FIG. 11B shows Gaussian-shaped beam profiles for an incident beam and a focused beam obtained by simulating the operation of an optical device configured in accordance with embodiments. The optical device is configured with air filled resonant cavities having cavity lengths of approximately 830 nm. The reflective structures are configured with a thickness of about 280 nm and have a refractive index of 3.48. The SWG layer has a refractive index of 3.2 and is configured with a cylindrical grating pattern that produces a focus length of about 68 μm. Curve 1106 represents the beam profile for a Gaussian-shaped incident beam of light polarized substantially perpendicular to the SWG layer lines. The beam profile 1108 reveals that the optical device produces a narrower Gaussian-shaped transmitted beam profile at the focus length of 68 μm. Thus, the beam width of the transmitted beam of light is reduced.

Figure 12:
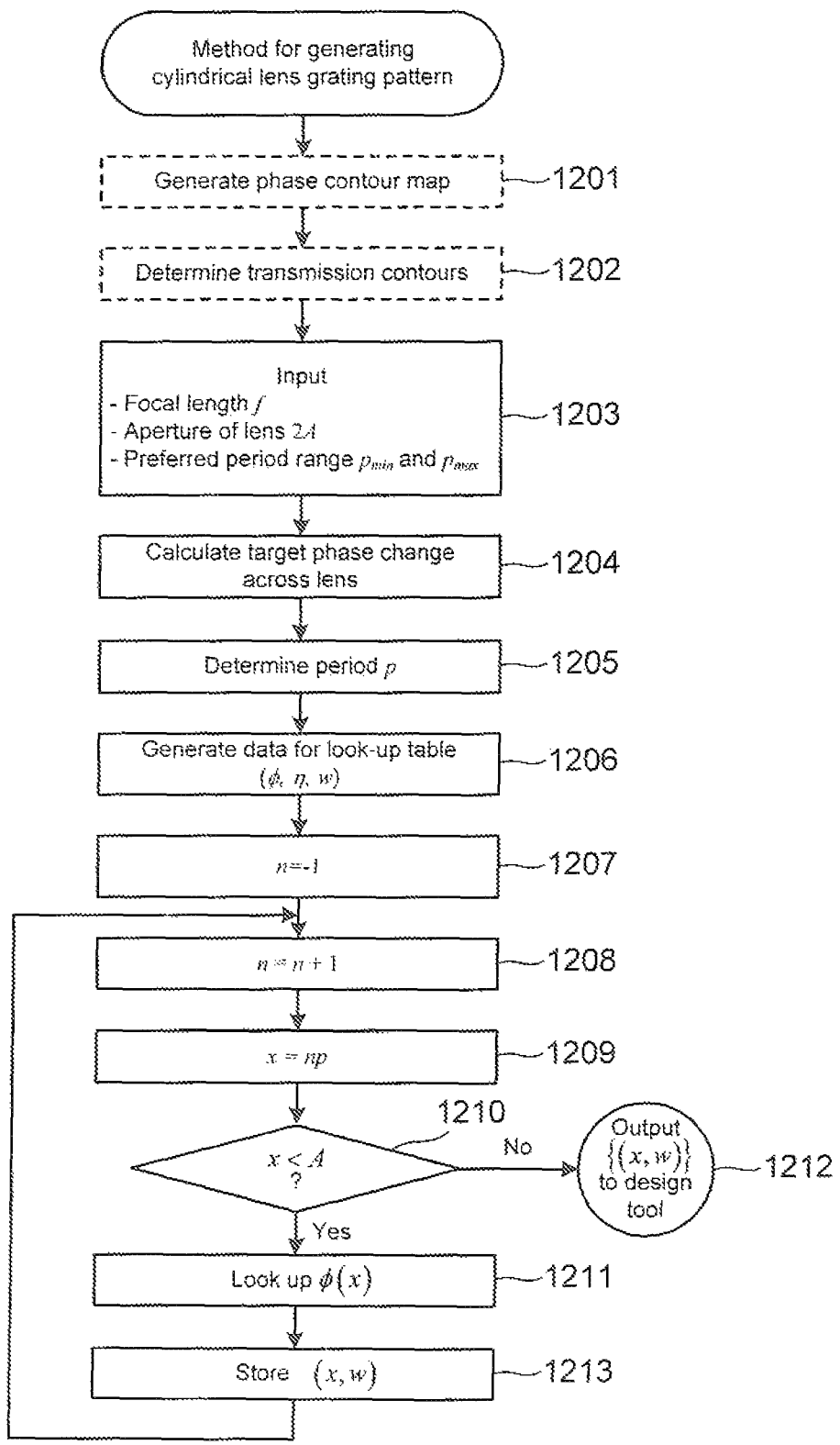
FIG. 12 shows a first control-flow diagram of a method for generating a grating pattern of a sub-wavelength grating layer in accordance with embodiments of the present invention.

FIG. 12 shows a control-flow diagram of a method for generating a grating pattern with a fixed period for a SWG layer of an optical device configured to operate as a convex lens in accordance with embodiments of the present invention. In step 1201, a phase contour map, represented by the phase contour plot shown in FIG. 9, is calculated to determine, in general, a data set {(p,η,$\phi$)} representing the relationship between transmitted phase shift, duty cycle and period of any SWG layer of an optical device. In step 1202, transmission contours are determined for the phase contour map, such as the transmission contours 906 and 908 for the 95% transmission, shown in FIG. 9. In step 1203, the desired minimum transmission, focal length, lens aperture 2A, and the preferred period range are input, as described above with reference to FIG. 10. In step 1204, the target phase change across the mirror along the x-direction is calculated as described above with reference to FIG. 11. In step 1205, the period p can be determined by matching the target phase change with a portion of the phase contour map with the constraints imposed by the minimum transmission and period range, as described above with reference to FIG. 11. In step 1206, a look-up table representing the relationship between phase and the line width is determined as described above with reference to FIG. 11. In step 1207, the period number n is initialized to the integer value −1. In step 1208, the period number is incremented. In step 1209, the x-coordinate is determined by x=tip. In step 1210, while x is less than A, the method proceeds to step 1211. Otherwise the method proceeds to step 1212. In step 1211, for the x determined in step 1209, the corresponding phase is determined from the look-up table determined in step 1206. In step 1213, the x-coordinates and line widths are stored as a data set {(x,w)} in a computer-readable medium, such as disk drive or optical disk. In step 1212, the data set is provided to a design tool for configuring the SWG layer to produce the desired the target phase change determined in step 1204, as described above.

Figure 13:
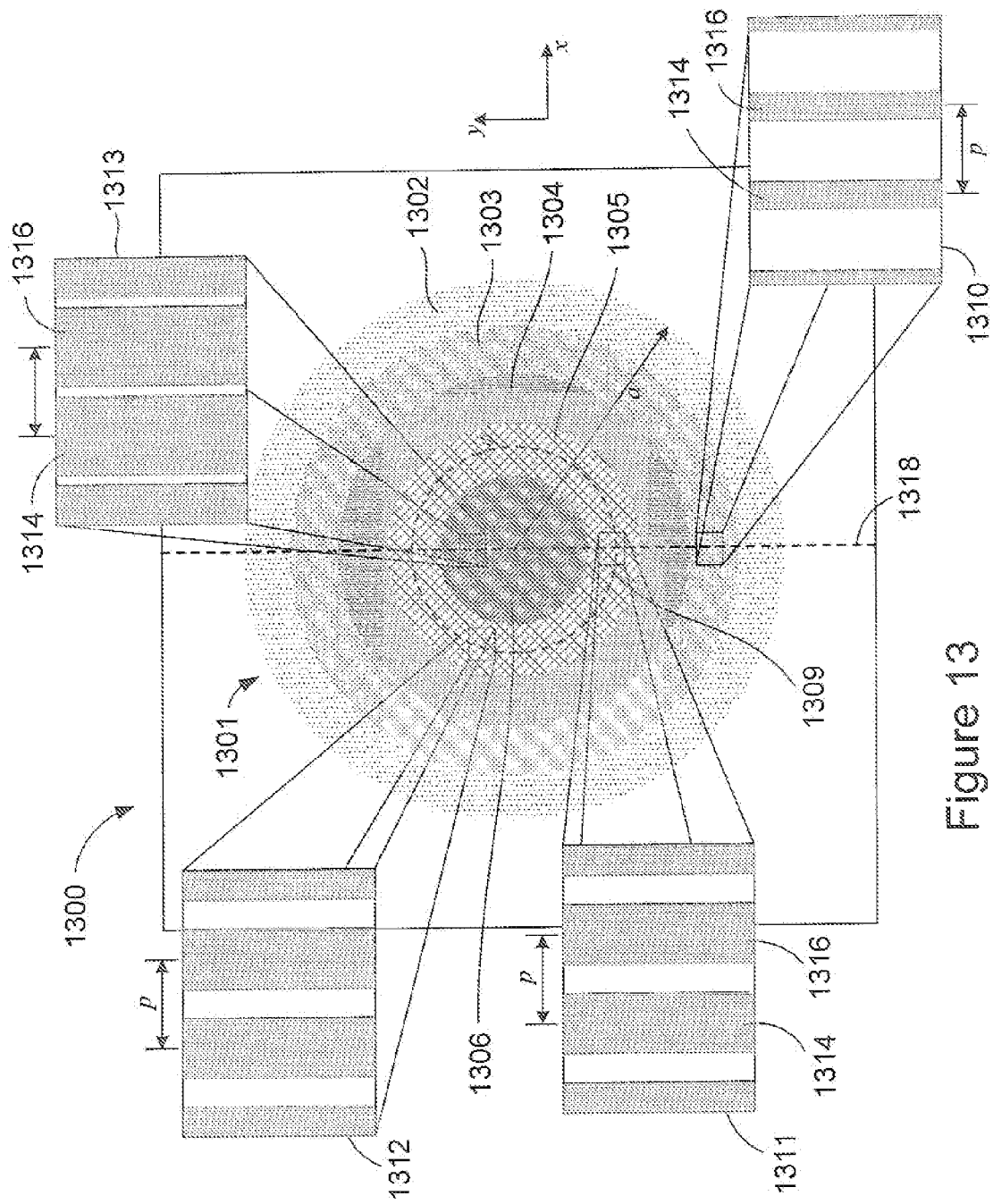
FIG. 13 shows a top plan view of a one-dimensional grating pattern of a sub-wavelength grating layer of an optical device configured to operate as a convex lens in accordance with embodiments of the present invention.

In certain embodiments, a SWG layer of an optical device can be configured so that the optical device can be operated as a convex lens for incident light polarized in any direction by appropriately tapering the lines of the SWG layer away from the center of the SWG layer. FIG. 13 shows a top plan view of a one-dimensional grating pattern of a SWG layer 1300 configured so that an optical device can be operated as a convex lens for incident light polarized any x-direction in accordance with embodiments of the present invention. The SWG layer 1300 includes a grating pattern 1301 represented by annular shaded regions 1302-1306. The grating pattern 1301 defines a circular aperture extending out from the origin with radius a. Each shaded annular region represents a different grating sub-pattern of lines formed in the grating layer 1301. The grating sub-patterns of the annular regions 1302-1306 have the same duty cycle as revealed in the four enlargements 1310-1313. The enlargements 1310-1313 show that the grating pattern 1301 comprises lines tapered in the y-direction with a constant line period spacing p in the x-direction. In particular, enlargements 1310, 1311, and 1313 are enlargements of the same lines 1314 and 1316 running parallel to dashed-line 1318 in the y-direction. Enlargements 1310, 1311, and 1313 reveal that the line period spacing p remains constant but the width of the lines 1314 and 1316 narrows or tapers away from the center of the grating layer 1301. Each annular region has the same duty cycle and period. For example, enlargements 1311 and 1312 reveal portions of the annular region 1305 comprising portions of different lines that have substantially the same duty cycle. As a result, each portion of an annular region produces the same approximate phase shift in the light transmitted through the optical device. For example, dashed circle 1309 represents a single phase shift contour in which light transmitted through the optical device anywhere along the circle 1309 acquires substantially the same phase ϕ.

Fabrication of the SWG layer 1300 is analogous to fabrication of the SWG layer 1000 described above. Prior to fabricating the SWG layer 1300, a minimum transmission, focal length f, mirror aperture radius a, and preferred period range $p_{min}$ and $p_{max}$ are determined. Once the parameters for the SWG layer 1300 have been determined, a target phase change across the lens extending out from the center is selected. For a convex lens, the target phase change produced by the convex lens can be determined according to the expression $$\phi(x) = \phi_0 + \frac{2\pi}{\lambda R_M} r_{rad}^2$$

where $\phi_0$ is the largest phase shift near the center of the lens, $R_M$ is the spherical radius or curvature of the lens, and $r_{rad}$ is the radius of the aperture from the center of the SWG layer with the constraints $0 \le r_{rad} \le a$ and $r_{rad}^2 = x^2 + y^2$.

Figure 14:
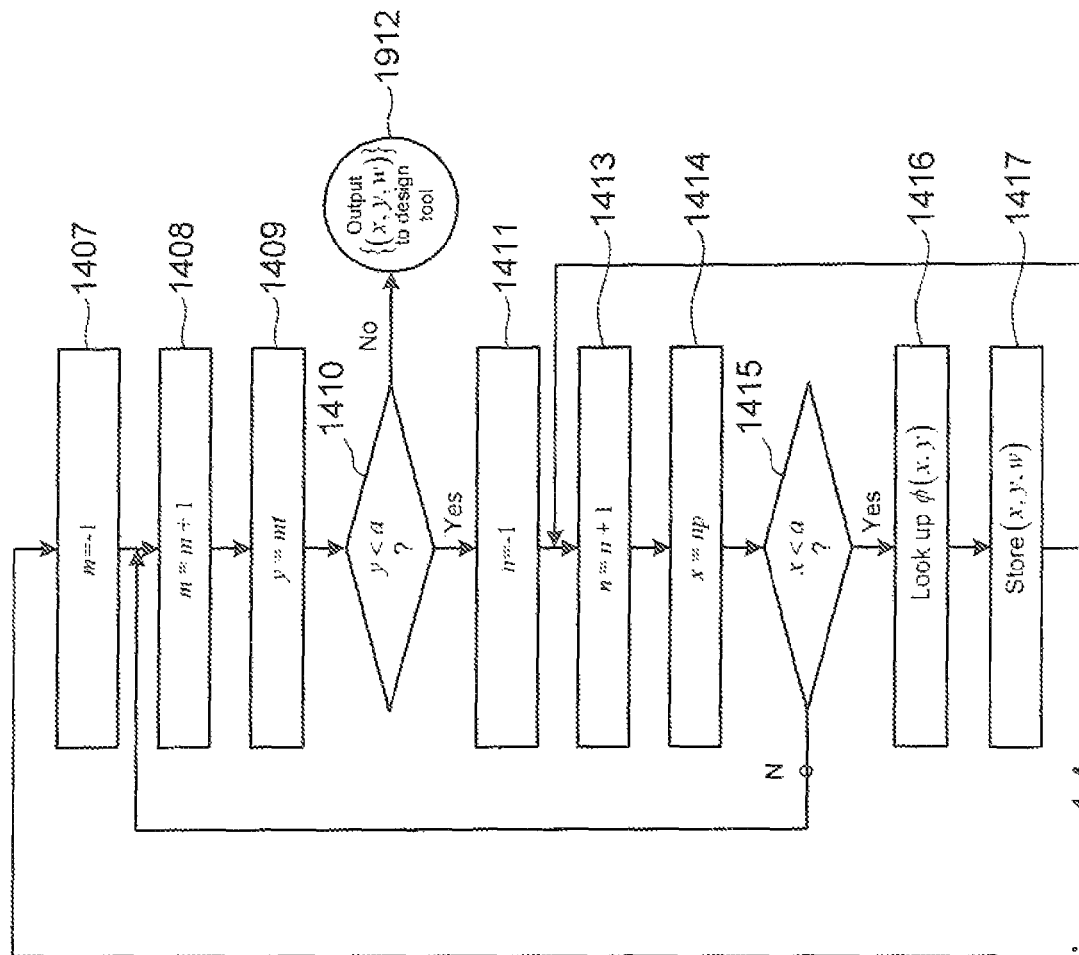
FIG. 14 shows a second control-flow diagram of a method for generating a grating pattern of a sub-wavelength grating layer in accordance with embodiments of the present invention.
Figure 14:
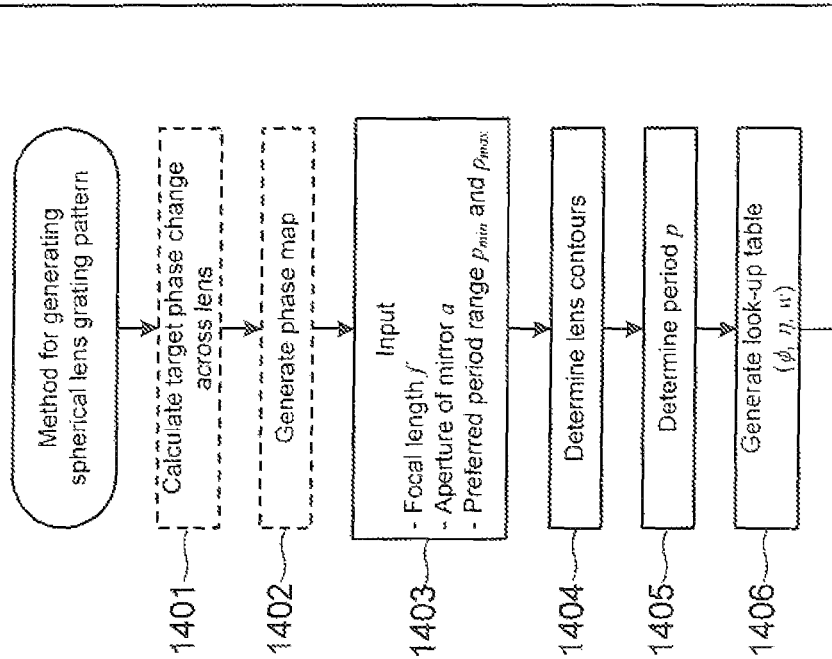

Methods for generating a grating pattern data for the SWG layer 1300 are analogous to the methods for generating grating pattern data for the SWG layer 1000 described above with reference to the control-flow diagram of FIG. 12, but with additional steps that account for tapering of lines in the y-direction. FIG. 14 shows a control-flow diagram of a method for generating a spherical mirror grating pattern for light polarized in the x-direction in accordance with embodiments of the present invention. Steps 1401 and 1402 are identical to steps 1201 and 1202, respectively, of the method described above with reference to FIG. 12. In step 1403, the minimum transmission, focal length, mirror radius a, and the preferred period range are input, as described above. In step 1404, the target phase change across the SWG layer along the radius $r_{rad}$ is calculated as described above with reference to FIG. 12. In step 1405, the period p is determined by matching the target phase change $\phi(r_{rad})$ with a portion of the phase contour map, shown in FIG. 9, with the constraints imposed by the minimum reflectivity and period range. In step 1406, a look-up table representing the phase $\phi(r_{rad})$ and the corresponding line width as a function of the radius $r_{rad}$ is determined. In step 1407, the number m is initialized to the integer value −1. In step 1408, m is incremented. In step 1409, the y-coordinate is determined by y=mt, where t is the period in the y-direction. In step 1410, while y is less than a, proceed to step 1411. Otherwise, proceed to step 1412. In step 1411, the number n is initialized to the integer value −1. In step 1412, n is incremented. In step 1414, the x-coordinate is determined by x=np. In step 1415, while x is less than a, the method proceeds to step 1416. Otherwise, the method returns and repeats steps 1408-1414. In step 1416, for x and y determined in steps 1414 and 1409, respectively, the corresponding phase is determined from the look-up table determined in step 1406. In step 1417, the width w corresponding the phase in the look-up table is recorded in a data set along with the x and y coordinates. In step 1412, the data set created below in steps 1416 and 1417 is sent to the design tool for processing.

The optical devices can be fabricated using conventional deposition and lithographic techniques. For example, the optical devices described above can all be fabricated by depositing a first semiconductor or metal layer on a surface of a silicon dioxide ("SiO$_2$") substrate using chemical vapor deposition ("CVD") or physical vapor deposition (PVD). Next, a polymer resist can be deposited over the first layer using CVD followed by depositing a second semiconductor layer using CVD or PVD. Next, the second semiconductor layer is configured to operate as the SWG layer using reactive ion etching, focusing ion beam milling, nanoimprint lithography, or any other suitable technique for forming grooves separating lines in the SWG layer. Next, a second polymer resist can be deposited over the second semiconductor layer using CVD followed by depositing a third semiconductor or metal layer using CVD or PVD. In certain embodiments, the polymer resist is composed of material having a lower refractive index than the first, second, and third semiconductor layers. In other embodiments, the polymer layer can be removed by depositing all five layers in an opening of a container, such as a hollow cylinder. Holes can be formed in the container walls to access the polymer layers. A solvent is introduced through the holes to dissolve the polymer layers leaving air spaces separating the three layers.

A general technique for configuring the duty cycle and period of a SWG layer are described. Consider a selected target phase distribution $\phi=\Psi(x)$ for an optical device. The target phase ϕ can also be described as a one-dimensional parametric function $\phi=\Phi(t)$ with corresponding parametric functions of a parameter t representing the period p=P(t) and duty cycle η=H(t). In other words, any point on the target phase distribution $\phi=\Psi(x)$ can be related to a parameter t and a corresponding phase described by $\phi=\Phi(t)$ with the corresponding period and duty cycle represented by the linear functions p=P(t) and η=H(t). For example, Φ(t) can be determined by matching $\phi=\Psi(x)$ to points along the line 910 shown in FIG. 9 between desired minimum transmission contours as described above. Projecting the curve onto the pη-plane of the contour surface shown in FIG. 9 produces a line that can be characterized by parametric equations P(t) and H(t). The phase at the center of the lens is determined by $\phi_0=\Psi(x_0=0)$. By solving $\Phi(t)=\Psi(x=0)$ for the value of $t=t_0$. The period and duty cycle for the line centered at position x=0 are $p_0=P(t_0)$ and $\eta_0=H(t_0)$. The center of the lens and duty cycles are found one-by-one following an iterative process described as follows:

Suppose the center position for period number n is x, with period value $p_n$. The center position of the next period can be determined by:

$$x_{n+1} = x_n + \frac{p_n}{2} + \frac{p_{n+1}}{2} \quad \text{Equation (1)}$$

where $x_n$ and $p_n$ are known values and $p_{n+1}$ is to be determined. The phase at position $x_{n+1}$ can be determined by the line $\Phi(t)$ at $t=t_{n+1}$, where $t_{n+1}$ is also a value to be determined. The phase at $x_{n+1}$ also satisfies the selected phase distribution $\Psi(x)$. Thus $$\Psi(x_{n+1})=\Phi(t_{n+1}) \quad \text{Equation (2):}$$

and $$p_{n+1}=P(t_{n+1}) \quad \text{Equation (3)}$$

Inserting Equations (1) and (3) into Equation (2) gives:

$$\Psi\left(x_n + \frac{p_n}{2} + \frac{p_{n+1}}{2}\right) = \Phi(t_{n-1}) \quad \text{Equation (4)}$$

Equation (4) is a function of only one unknown $t_{n+1}$ which can be solved numerically. After finding $t_{n+1}$, $p_{n+1}$ is found by equation (3) and $x_{n+1}$ is found by equation (1), while the duty cycle is calculated from $\eta_{n+1}=H(t_{n+1})$. The former iteration process is repeated until $x_n \geq A$ where A is the specified lens radius. Although it may be possible for some give continuous lines ($\Phi(t)$, $P(t)$, $H(t)$), a solution for equation (4) may not exist. In practice, such situations should be rare.

Figure 15:
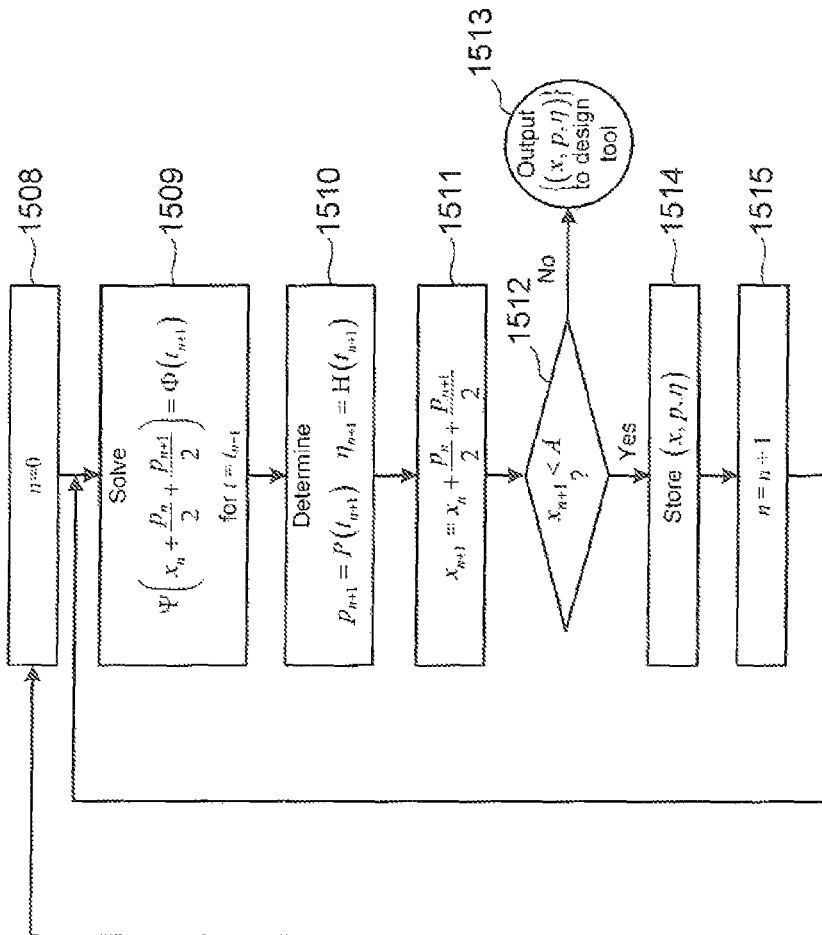
FIG. 15 shows a third control-flow diagram of a general method for generating a grating pattern a sub-wavelength grating layer in accordance with embodiments of the present invention.
Figure 15:
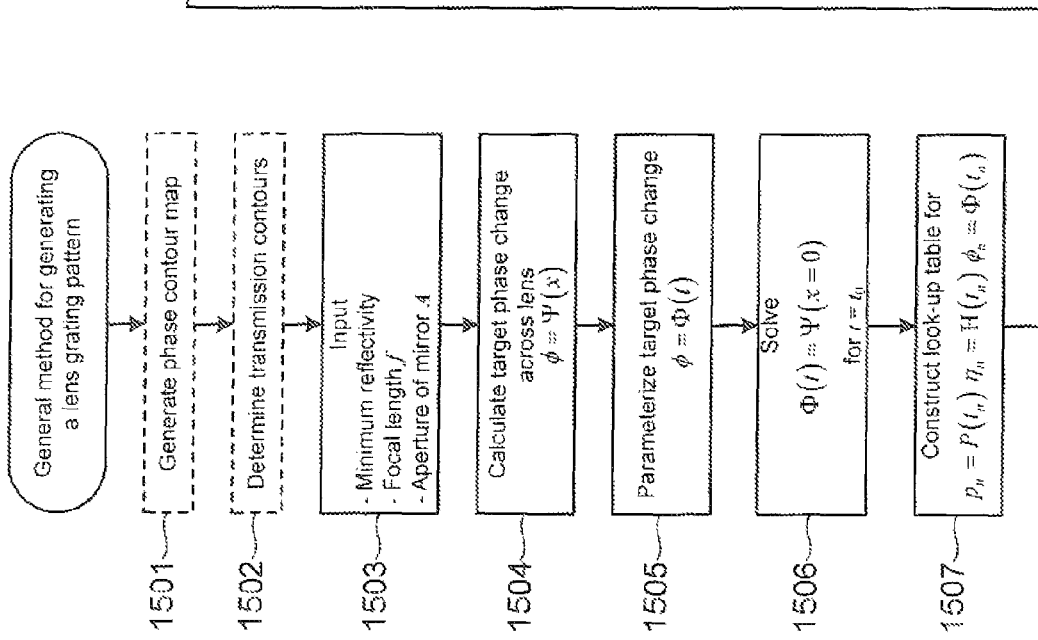

FIG. 15 shows a control-flow diagram for generating a grating pattern where the period and duty cycle are allowed to vary in accordance with embodiments of the present invention. In step 1501, a phase contour map, represented by the phase contour plot shown in FIG. 9, is calculated to determine, in general, a data set $\{(p,\eta,\phi)\}$ representing the relationship between transmitted phase shift, duty cycle and period of any SWG layer of an optical device. In step 1502, transmission contours are determined for the phase contour map, such as the transmission contours 906 and 908 for the 95% transmission shown in FIG. 9. The phase contour map $\{(p,\eta,\phi)\}$ and the transmission contour data can be stored in and retrieved from a computer-readable medium, as described in greater detail below with reference to FIG. 16. Note that steps 1501 and 1502 can be performed one time and the data used in the execution of steps 1503-1513 to determine grating patterns for focusing and diverging lenses, or used to generate a grating pattern for any other SWG optical device. In step 1503, the minimum transmission, focal length, lens radius A can be input as described above. In step 1504, a selected target phase change across the lens $\phi=\Psi(x)$ can be determined as described below with reference to FIGS. 11 and 13. In step 1505, the target phase $\phi=\Psi(x)$ is matched to a continuous curve of the phase contour surface within a desired transmission region, such as the curve represented by line 910 of FIG. 9 for minimum transmission 95%. The target phase $\phi=\Psi(x)$ is parameterized to obtain a one-dimensional parametric function $\phi=\Phi(t)$. In step 1506, the phase at the center of the lens is determined by $\phi_0=\Psi(x_0=0)$. By solving $\Phi(t)=\Psi(x=0)$ for the value of $t=t_0$, the period and duty cycle for the line centered at position $x_0=0$ are given by $p_0=P(t_0)$ and $\eta_0=H(t_0)$. In step 1507, a look-up table for the period $p_n=P(t_n)$, duty cycle $\eta_n=H(t_n)$, and phase $\phi_n=\Phi(t_n)$ as a function of the parameter t, is constructed. In step 1508, the period number n is initialized to zero. In step 1509, equation (3):

$$\Psi\left(x_n + \frac{p_n}{2} + \frac{P(t_{n+1})}{2}\right) = \Phi(t_{n+1})$$

is solved for $t_{n+1}$ numerically using Newton's method or another suitable numerical method for determining $t_{n+1}$. In step 1510, given $t_{n+1}$, the period $p_n=P(t_n)$ and duty cycle $\eta_n=H(t_n)$ can be determined from the look-up table. In step 1511, the center position of the next period can be determined by:

$$x_{n+1} = x_n + \frac{p_n}{2} + \frac{p_{n+1}}{2}$$

In step 1512, while $x_{n+1}$ is less than A, proceed to step 1514 where the three-tuple $(x_n,p_n,\eta_n)$ can be stored in a computer readable medium as described below. Otherwise, proceed to step 1513. In step 1515, the period number is incremented. In step 1513, the stored values $(x_n,p_n,\eta_n)$ can be sent to a design tool where a SWG layer with the input parameters can be fabricated.

Figure 16:
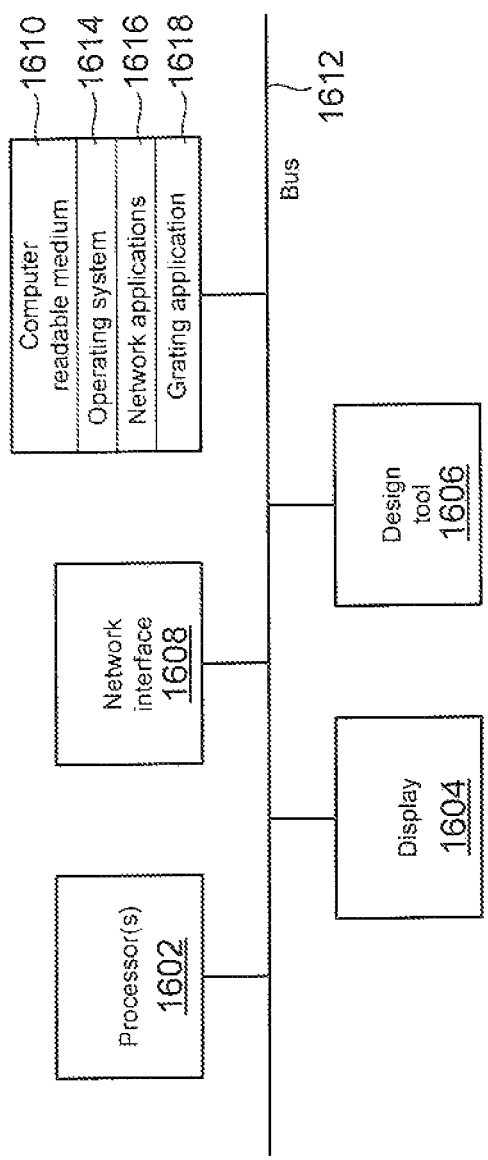
FIG. 16 shows a schematic representation of a computing device configured in accordance with embodiments of the present invention.

In general, the methods employed to generate grating pattern data for a SWG layer described above with reference to FIGS. 12, 14, and 15 can be implemented on a computing device, such as a desktop computer or a laptop. FIG. 16 shows a schematic representation of a computing device 1600 configured in accordance with embodiments of the present invention. The device 1600 includes one or more processors 1602, such as a central processing unit; one or more display devices 1604, such as a monitor; a design tool interface 1606; one or more network interfaces 1608, such as a Local Area Network LAN, a wireless 802.11×LAN, a 3G mobile WAN or a WiMax WAN; and one or more computer-readable mediums 1610. Each of these components is operatively coupled to one or more buses 1612. For example, the bus 1612 can be an EISA, a PCI, a USB, a FireWire, a NuBus, or a PDS.

The computer readable medium 1610 can be any suitable medium that participates in providing instructions to the processor 1602 for execution. For example, the computer readable medium 1610 can be non-volatile media, such as an optical disk, a magnetic disk, or a magnetic disk drive; volatile media, such as memory; and transmission media, such as coaxial cables, copper wire, and fiber optics. The computer readable medium 1610 can also store other software applications, including word processors, browsers, email, Instant Messaging, media players, and telephony software.

The computer-readable medium 1610 may also store an operating system 1614, such as Mac OS, MS Windows, Unix, or Linux; network applications 1616; and a grating application 1618. The operating system 1614 can be multi-user, multiprocessing, multitasking, multithreading, real-time and the like. The operating system 1614 can also perform basic tasks such as recognizing input from input devices, such as a keyboard or a keypad; sending output to the display 1604 and the design tool 1606; keeping track of files and directories on medium 1610; controlling peripheral devices, such as disk drives, printers, image capture device; and managing traffic on the one or more buses 1612. The network applications 1616 includes various components for establishing and maintaining network connections, such as software for implementing communication protocols including TCP/IP, HTTP, Ethernet, USB, and FireWire.

The grating application 1618 provides various software components for generating grating pattern data, as described above. In certain embodiments, some or all of the processes performed by the application 1618 can be integrated into the operating system 1614. In certain embodiments, the processes can be at least partially implemented in digital electronic circuitry, or in computer hardware, firmware, software, or in any combination thereof.

V. Other Sub-Wavelength Gratings for Optical Devices

Figure 17B:
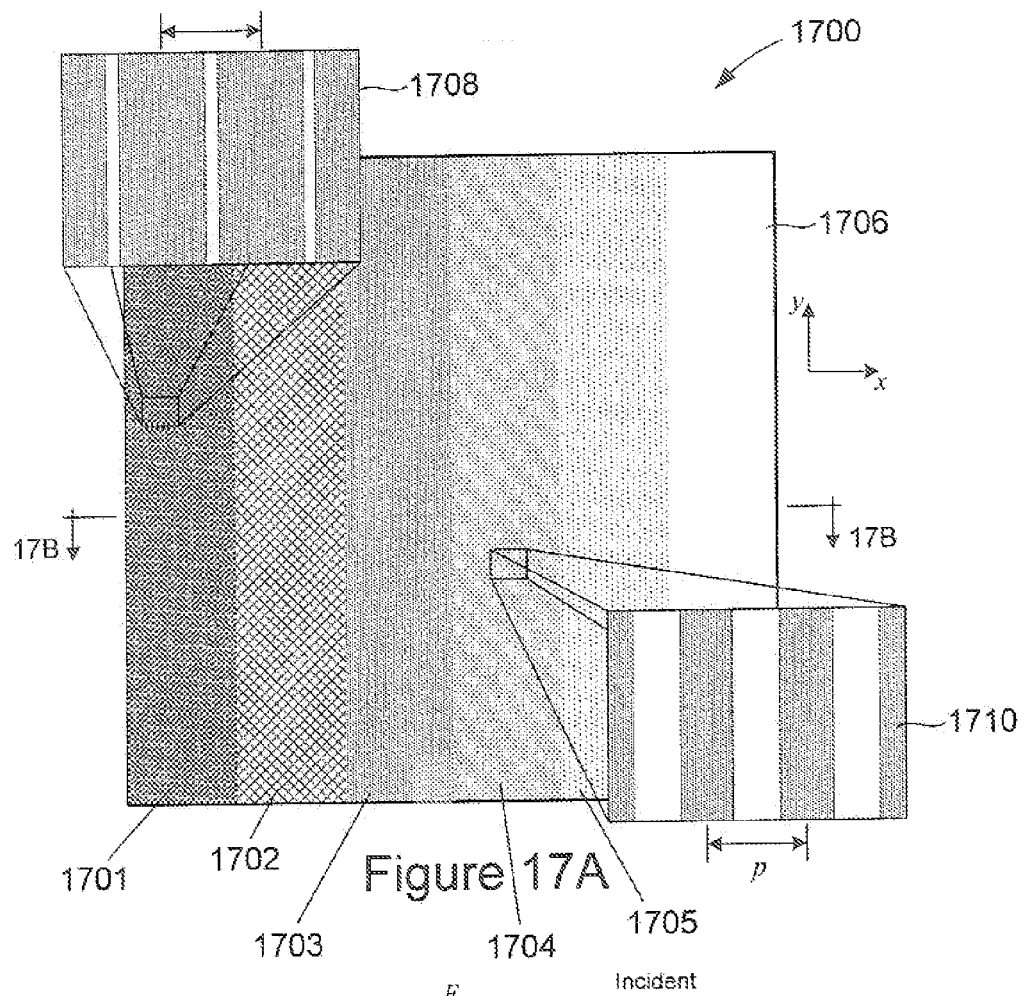
FIG. 17B shows a cross-sectional view of a sub-wavelength grating layer inserted into an optical device along a line 17B-17B, shown in FIG. 17A, in accordance with embodiments of the present invention.
Figure 17B:
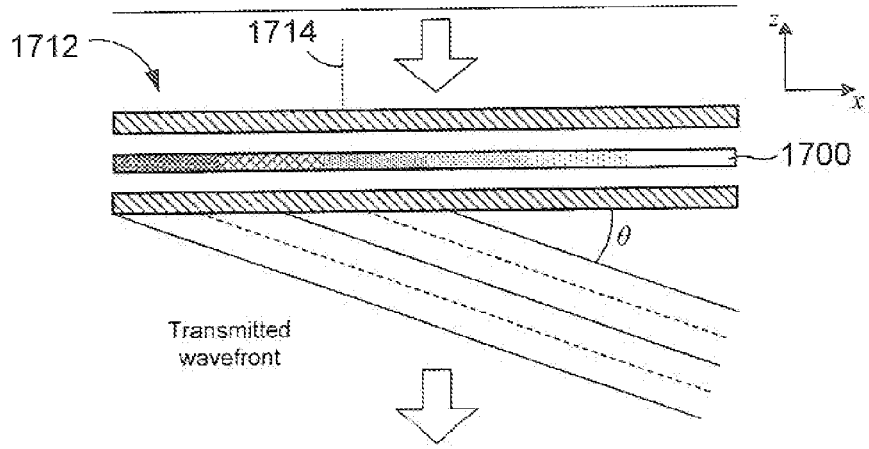

Embodiments of the present invention are not limited to optical devices configured to operate as convex lenses. In other embodiments, the SWG layer can be configured to provide arbitrary phase front shape modulation. In certain embodiments, a SWB layer of an optical device can be configured so that the optical device operates like a prism with transmitted light directed away from the surface normal of the optical device. FIG. 17A shows a top plan view of a one-dimensional grating pattern of a SWG layer 1700 of an optical device configured to operate as prism for normal incident light polarized in the x-direction in accordance with embodiments of the present invention. The SWG layer 1700 includes regions 1701-1706, with each region formed from lines extending in the y-direction, having the same period, but with the duty cycle progressively decreasing from the region 1701 to the region 1706. Enlargements 1708 and 1710 show sub-regions of regions 1701 and 1704 with the same line period spacing p where the lines of region 1701 have a relatively larger duty cycle than the lines of region 1704. The duty cycles for the regions 1701-1706 are selected so that the resulting phase change in transmitted light is largest for the region 1701 and decreases nearly linearly from the region 1701 to the region 1706. FIG. 17B shows a cross-sectional view of the SWG layer 1700 inserted into an optical device 1712 along a line 17B-17B, shown in FIG. 17A, operated in accordance with embodiments of the present invention. The phase change causes incident light polarized in the x-direction and directed normal to the first surface to be transmitted with an angle θ away from the surface normal 1714.

Figure 18:
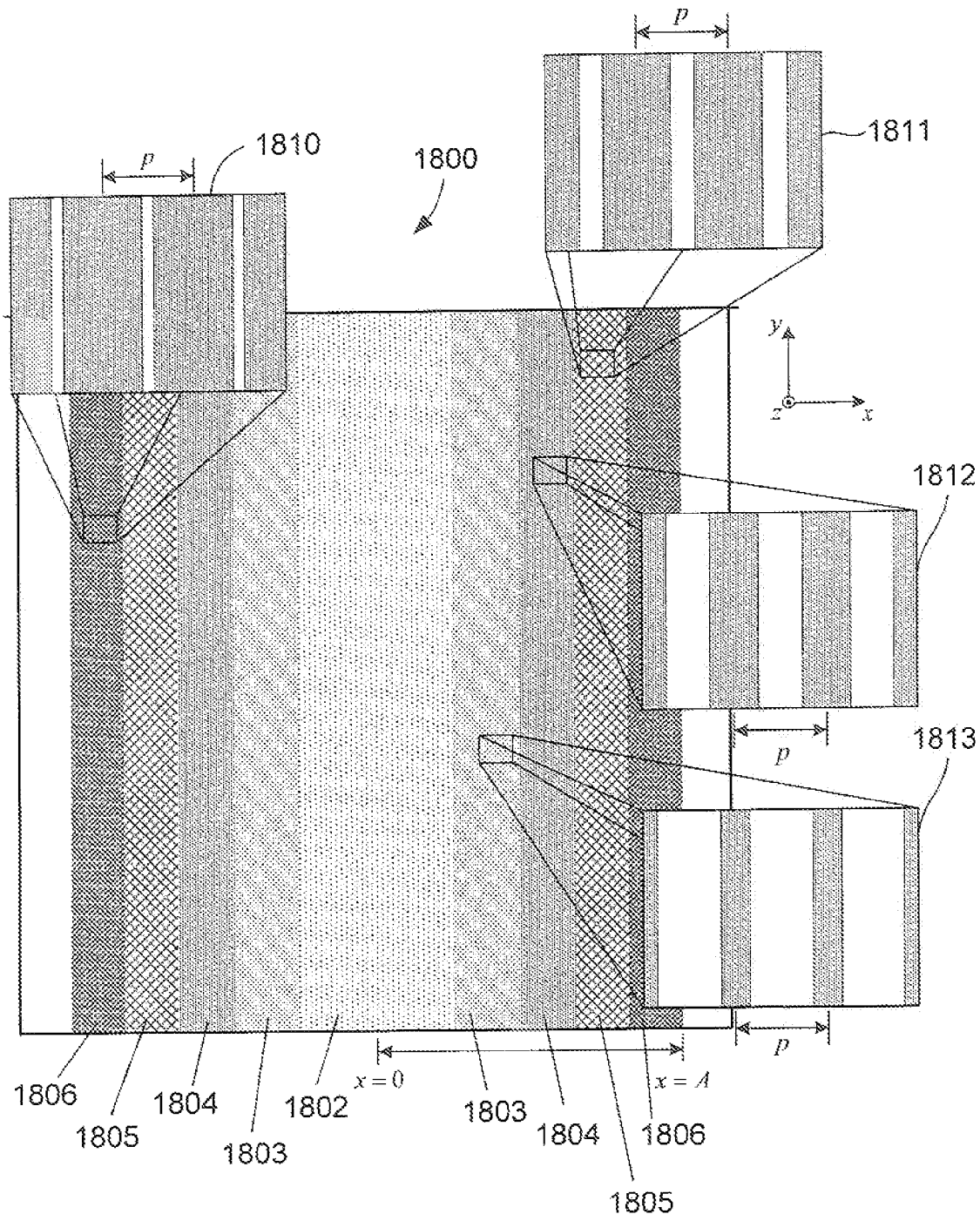
FIG. 18 shows a top plan-view of a one-dimensional grating pattern for a sub-wavelength grating layer of an optical device configured to operate as a concave lens in accordance with embodiments of the present invention.

In other embodiments, optical devices can be configured to operate as a concave lens by imprinting an appropriate grating pattern in a SWG layer with a duty cycle that increases away from the center of the SWG layer. For example, FIG. 18 shows a top plan-view of a one-dimensional grating pattern for a SWG layer of an optical device configured to operate as a concave lens for incident light polarized in the x-direction in accordance with embodiments of the present invention. The grating pattern 1802 defines lens aperture extending the length of the SWG 1800 in the y-direction and having a length 2A in the x-direction. FIG. 18 includes shaded regions 1804-1808, with reverse duty cycles compared to the regions 1002-1006 shown in FIG. 10. For example, enlargements 1810-1813 show that the duty cycle q increases away from the center x=0. The grating pattern is configured to cause transmitted light polarized in the x-direction to diverge as it passed through the optical device, as described above with reference to FIG. 6B.

Figure 19:
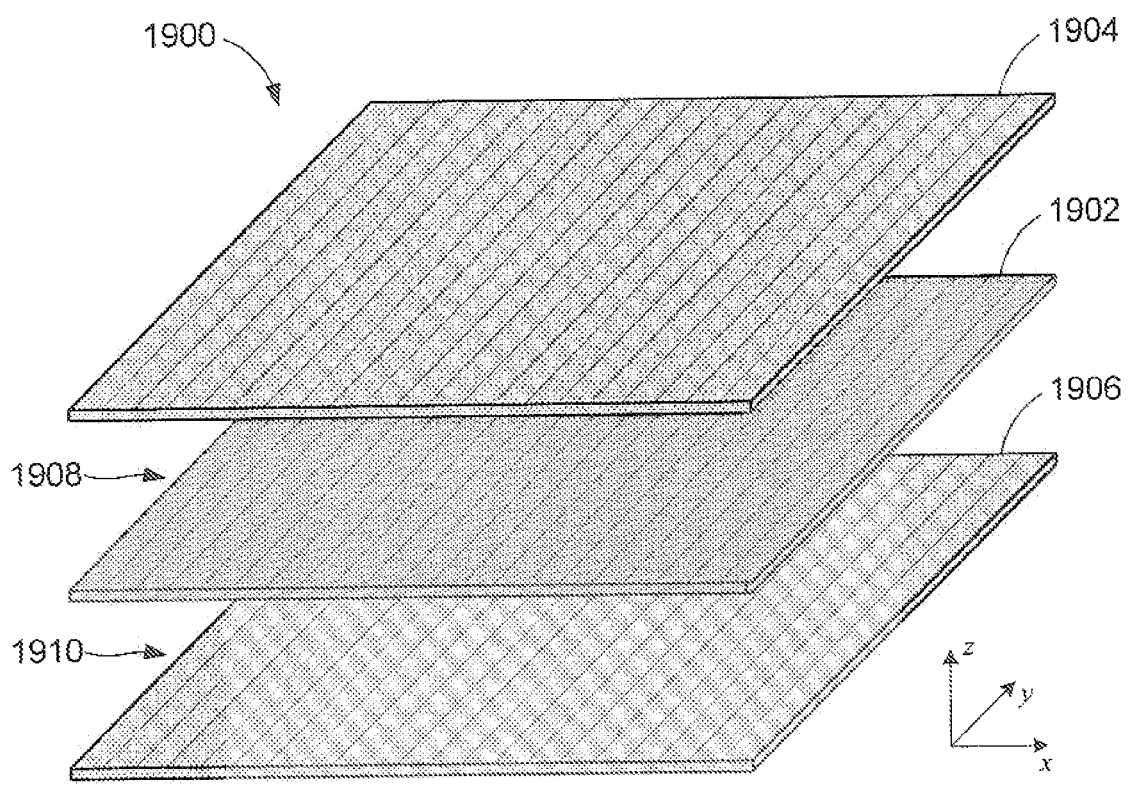
FIG. 19 shows an isometric view of an optical device configured in accordance with embodiments of the present invention.

In other embodiments, instead of the reflective structures of an optical device being plates, one or both of the reflective structures can be configured as an SWG layer. FIG. 19 show an isometric view of an optical device 1900 configured in accordance with embodiments of the present invention. The optical device 1900 includes a substantially planar SWG layer 1902 disposed between two approximately parallel, substantially planar, SWG layers 1904 and 1906. As shown in the example of FIG. 19, the substantially planar SWG layer 1902 is positioned approximately parallel to the SWG layers 1904 and 1906 with space separating the SWG layer 1902 from the SWG layers 1904 and 1906. The space separating the SWG layer 1902 from the SWG layer 1904 forms a resonant cavity 908, and the space separating the SWG layer 1906 form the SWG layer 1906 forms a second resonant cavity 1910, for appropriate wavelengths of electromagnetic radiation. The SWG layers 1904 and 1906 can be composed of a dielectric material, a semiconductor; a metal, such as gold or silver; or any other suitable material for forming resonant cavities 1908 and 1910. In certain embodiments, the cavities 1908 and 1910 can be filled with a suitable material having a lower refractive index then the layers 1902, 1904, and 1906, such as a suitable polymer material. In other embodiments, the cavities 1908 and 1910 can be air filled with the reflective structures 1904 and 1906 and the SGW layer 1902 supported by at least one wall of a container (not shown), such as a rectangular container. In other embodiments, one of the reflective structures 1904 and 1906 can be a plate, as described above with reference to FIG. 1.

Figure 20:
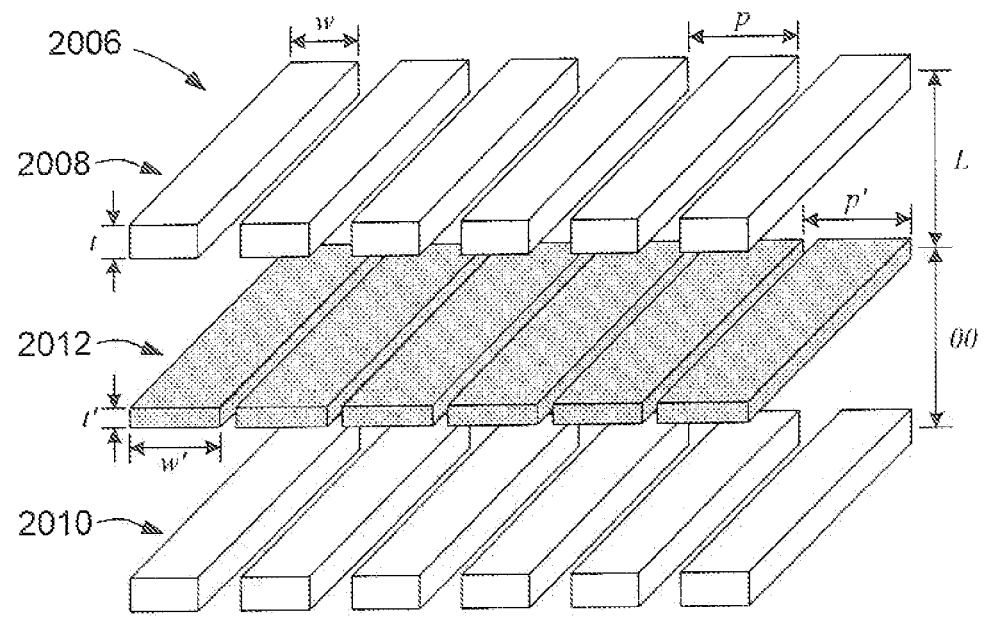
FIG. 20 shows a transmittance plot and a phase shift plot over a range of incident light wavelengths for an optical device configured in accordance with embodiments of the present invention.
Figure 20:
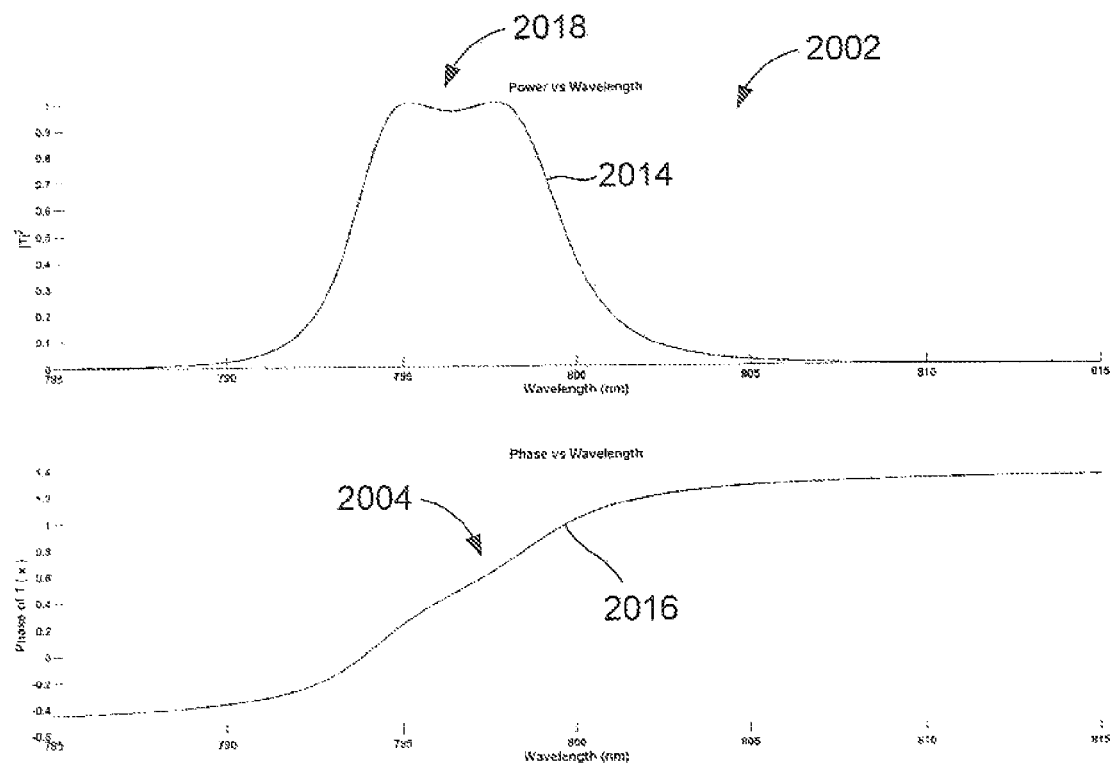

FIG. 20 shows a transmittance plot 2002 and a phase shift plot 2004 over a range of incident light wavelengths for an optical device 2006 configured in accordance with embodiments of the present invention. As shown in the example of FIG. 20, the reflective structures of the optical device 2006 are SGW layers 2008 and 2010 with a SWG layer 2012 disposed in between. The cavity length L is 800 nm, the duty cycle for the SWG layers 2008 and 2010 is 0.43, and the duty cycle for the SWG layer 2012 is 0.62. The SWG layers 2008 and 2010 have a refractive index of 3.48, and the SWG layer 2012 has a refractive index of 3.2. The optical device 2012 is operated at normal incidence with the electric field polarized substantially perpendicular to the lines of layers 2008, 2010, and 2012. In plot 2002, curve 2014 corresponds to the transmittance $T(\lambda)$, and in the plot 2004, curve 2016 corresponds to the phase shift $\phi(\lambda)$ produced by the optical device 2006. The transmittance and phase shift curves 2014 and 2016 represent expected operation of the device 2006 based on simulation results that can be obtained using either MEEP or COMSOL Multiphysics®. Curve 2014 reveals a broad spectral region of high transmittance 2018. However, curve 2016 reveals that the phase of the transmitted light varies across the entire high-transmittance region 2018.

In other embodiments, SWG layers of an optical device can be configured with a two-dimensional grating pattern with tapered or untapered lines and/or by patterning in the x- and y-directions.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated.

It is intended that the scope of the invention be defined by the following claims and their equivalents:

The invention claimed is:

1. An optical device comprising:
   a first substantially planar reflective structure;
   a second substantially planar reflective structure;
   a substantially planar sub-wavelength diffraction grating layer disposed between the first reflective structure and the second reflective structure, wherein at least one of the first reflective structure and the second reflective structure are configured as sub-wavelength diffraction grating layers, wherein the substantially planar sub-wavelength diffraction grating layer is configured with lines having line widths, line thicknesses, and line period spacing selected to control phase changes in different portions of a beam of light transmitted through the optical device;
   a first resonant cavity formed between the first reflective structure and the substantially planar sub-wavelength diffraction grating layer; and
   a second resonant cavity formed between the second reflective structure and the substantially planar sub-wavelength diffraction grating layer.

2. The optical device of claim 1, wherein one of the first reflective structure and the second reflective structure is a reflective plate.

3. The optical device of claim 1, wherein
   the first resonant cavity and the second resonant cavity are air filled; or
   the first resonant cavity and the second resonant cavity are filled with a material having lower refractive index than the refractive indices associated with the first reflective structure, the second reflective structure and the substantially planar sub-wavelength diffraction grating layer.

4. The optical device of claim 1, wherein the substantially planar sub-wavelength diffraction grating layer further comprising a substrate, with a grating pattern disposed on a surface of the substrate and the grating pattern is formed in a material having a higher refractive index than the substrate.

5. The optical device of claim 1, wherein the substantially planar sub-wavelength diffraction grating layer further comprises a membrane.

6. The optical device of claim 4, wherein the grating pattern further comprises a one-dimensional pattern of lines.

7. The optical device of claim 6, wherein the one-dimensional pattern of lines further comprises one or more sub-regions of lines, the lines within each sub-region having a selected period and line width.

8. The optical device of claim 1, wherein the lines width, line thickness, and line period spacing are selected to form a convex lens.

9. The optical device of claim 1, wherein the lines widths, line thickness, and line period spacing are selected to form a concave lens.

10. The optical device of claim 1, wherein the line width, line thickness, and line period spacing are selected to form a prism.

11. A method for fabricating a sub-wavelength grating layer of an optical device using a computing device, the method comprising:
    calculating a desired target phase change across the optical device using the computing device, the target phase change corresponding to a desired wavefront shape in a beam of light transmitted through the optical device;
    generating line widths, line period spacing, and line thickness corresponding to the target phase change across the sub-wavelength grating layer using the computing device; and
    generating a set of coordinates using the computing device, each coordinate identifying the location of a line with a line width, line period spacing, and line thickness.

12. The method of claim 11 further comprising:
    depositing a first layer of material corresponding to a planar first reflective structure;
    depositing a first polymer material layer over the first layer;
    depositing a second layer of material over the first polymer layer;
    defining a grating pattern of lines in the second layer corresponding to a sub-wavelength gating pattern based on the set of coordinates;
    depositing a second polymer material layer over the second layer and
    depositing a third layer of material corresponding to a planar second reflective structure.

13. The method of claim 12 further comprising defining a grating pattern of lines in the first layer corresponding to the first reflective structure and/or the second layer corresponding to the second reflective structure.

14. The method of claim 11 further comprising:
    arranging a first layer of material corresponding to a first planar reflective structure;
    forming a grating pattern of lines in a second layer corresponding to a sub-wavelength gating pattern based on the set of coordinates;
    arranging the second layer of material a given distance over the first layer; and
    arranging a third layer of material corresponding to a second planar reflective structure over the second layer.

15. The method of claim 14, wherein a space between the first layer and the second layer is a first resonant cavity and a space between the second layer and the third layer is a second resonant cavity, the first resonant cavity and the second resonant cavity being air filled.

16. The method of claim 11, wherein the line widths, line period spacing, and line thickness are selected to form a convex lens.

17. The method of claim 11, wherein the line widths, line period spacing, and line thickness are selected to form a concave lens.

18. The method of claim 11, wherein the line widths, line period spacing, and line thickness are selected to form a prism.

* * * * *